US012698106B2

(12) United States Patent
Baek

(10) Patent No.: US 12,698,106 B2
(45) Date of Patent: Aug. 4, 2026

(54) DRONE SHADE CANOPY USING AD-BALLOON AND FRAME, AND SHADE CANOPY USING SAME

(71) Applicant: Jin Heum Baek, Gyeongsangnam-do (KR)

(72) Inventor: Jin Heum Baek, Gyeongsangnam-do (KR)

( * ) Notice: Subject to any disclaimer, the term of this patent is extended or adjusted under 35 U.S.C. 154(b) by 0 days.

(21) Appl. No.: 18/858,154

(22) PCT Filed: Apr. 14, 2023

(86) PCT No.: PCT/KR2023/005136
§ 371 (c)(1),
(2) Date: Oct. 18, 2024

(87) PCT Pub. No.: WO2023/204539
PCT Pub. Date: Oct. 26, 2023

(65) Prior Publication Data
US 2025/0269988 A1      Aug. 28, 2025

(30) Foreign Application Priority Data

Apr. 18, 2022     (KR) ........................ 10-2022-0048071
Apr. 14, 2023     (KR) ........................ 10-2023-0049245

(51) Int. Cl.
*E04F 10/02*          (2006.01)
*B64U 20/70*          (2023.01)
(Continued)

(52) U.S. Cl.
CPC .............. *B64U 20/70* (2023.01); *E04F 10/02* (2013.01); *G09F 19/008* (2021.05); *B64U 2101/24* (2023.01); *B64U 2101/26* (2023.01)

(58) Field of Classification Search
CPC ................ B64U 20/70; B64U 2101/24; B64U 2101/26; E04F 10/02; G09F 19/008
See application file for complete search history.

(56) References Cited

U.S. PATENT DOCUMENTS 6,008,938 A * 12/1999 Suehle ................... E01F 9/654
                                              359/443
6,408,453 B1 * 6/2002 Song ...................... E04H 4/103
                                              4/499
(Continued)

FOREIGN PATENT DOCUMENTS

JP          2020029198 A      2/2024
KR       1020160061082 A      5/2016
(Continued)

OTHER PUBLICATIONS

International Search Report and Written Opinion issued in corresponding International Application PCT/KR2023/005136, mailed Aug. 3, 2023, 12 pages.
(Continued)

*Primary Examiner* — Tye William Abell
(74) *Attorney, Agent, or Firm* — Burris Law, PLLC

(57)          ABSTRACT

The drone shade tarp is easy to install by easily moving a large ad balloon frame into the air, and the shade tarp can be quickly removed depending on weather and wind, thereby solving safety problems, and moving the shade tarp according to the direction of sunlight can provide an efficient shade tarp. Also, the drone shade tarp can couple the cover drone to the advertising balloon frame in the air, even if air is used without using a gas such as expensive helium, a heavy large shade can be easily installed. It forms a groove in the ad balloon frame and increases the strength of the frame by a rigid frame support inserted there, helping the stable movement of the drone shade and fixing of the drone. Cover drones can be easily combined in the air using electromagnets or the like to form a shade tarp effectively.

19 Claims, 32 Drawing Sheets

(51) Int. Cl.
  *B64U 101/24*      (2023.01)
  *G09F 19/00*       (2006.01)
  *B64U 101/26*      (2023.01)

(56)                    References Cited

U.S. PATENT DOCUMENTS

| | | | | |
|---|---|---|---|---|
| 10,424,231 | B2 * | 9/2019 | Salem | B60L 53/68 |
| 11,202,488 | B1 * | 12/2021 | Wan | E04H 6/42 |
| 2011/0315811 | A1 * | 12/2011 | Al-Garni | A45B 23/00 |
| | | | | 244/30 |
| 2022/0112739 | A1 * | 4/2022 | Baek | E04H 15/20 |
| 2024/0166380 | A1 * | 5/2024 | Ordieres | B64U 10/13 |

FOREIGN PATENT DOCUMENTS

| | | | |
|---|---|---|---|
| KR | 1020160105148 | A | 9/2016 |
| KR | 101825540 | B1 | 2/2018 |
| KR | 1020200128895 | A | 11/2020 |
| KR | 102230358 | B1 | 3/2021 |
| KR | 1020220156433 | A | 11/2022 |
| WO | 2017154551 | A1 | 9/2017 |

OTHER PUBLICATIONS

Office Action issued in Korean counterpart application No. 10-2023-0049245 on Oct. 11, 2024, and English translation thereof, 18 pages.

* cited by examiner (a)

(b)

(a)

(b)

(a)

(b)

(a)

(b)

(c)

(a)

(b)                                    (c)

(a)

(b)

(a)

(b)

(a)

(b)

(a)

(b)

(a)

(b)

(c)

(a)

(b)

DRONE SHADE CANOPY USING AD-BALLOON AND FRAME, AND SHADE CANOPY USING SAME

CROSS-REFERENCE TO RELATED APPLICATIONS

This application is a U.S. National Phase Application of PCT/KR2023/005136 filed Apr. 14, 2023, which claims priority to Korean Patent Application No. 10-2022-0048071, filed on Apr. 18, 2022 and Korean Patent Application No. 10-2023-0049245 filed Apr. 14, 2023, in Korean Intellectual Property Office, and entitled "Drone Shade Canopy Using Ad-Balloon And Frame, And Shade Canopy Using Same", the contents of which are hereby incorporated by reference in their entirety.

TECHNICAL FIELD

The present invention relates to a drone shade tarp, and more particularly, to a drone shade tarp formed by comprising cover portions on a lattice-like ad balloon frame, which can be flew into the air by installed drones, or a drone shade tarp formed by comprising cover drone, which can be flew onto a lattice-like ad balloon frame installed in the air. Thereby it can solve the difficulty of moving a huge, ground-assembled shade tarp into the air, and allow for rapid installation and removal of the shade tarp.

The present invention also relates to a shade tarp consisting of said drone shade tarps being seated on a wire to provide shade for a long period of time.

BACKGROUND ART

The prior art invention, namely this applicant's patent no. KR 10-2230358 (name of the invention: shade tarp using advertising balloon, hereinafter referred to as "prior art 1") is provided a safe shade tarp by including the cover portion that is movable above and below on a lattice-like advertising balloon frame made of vinyl cylinder, because the wind pressure applied to the cover portion is reduced, namely the cover portion connected by strings is movable above when the wind blows.

Also KR patent application no. 10-2022-34297 (name of the invention: shade tarp that can withstand strong winds by using strings and advertising balloons, hereinafter referred to as "prior art 2") is equipped with vertical strings which are connected to a wire or net installed on the top of vertical support, and the cover portion does not sway from side to side when the cover portion is moving up and down, because the vertical strings guide stably the cover portion.

However, for prior art 1 and 2, the shade tarp of ad balloon frame is always anchored to the ground, so it's not easy to install or disassemble the shade tarp when the wind blows strongly.

In addition, conventional shade tarp using ad balloons has problems with the rigidity of the ad balloon frame in windy or bad weather conditions, so there is a need for a strong and lightweight frame to maintain the rigidity of the ad balloon frame.

In addition, the vertical string is a insufficient rigidity, which does not allow the cover portion to guide naturally, when the cover portion moves up and down.

In addition, protective measures against hacking or falls in the event of strong winds are needed for drones.

Also, if the cover portion is fixed to the upper wire through vertical strings, as in prior art 2, it's not easy to disassemble or re-install the shade tarp when strong winds are expected or in the evening when shade tarp is not needed.

Because drones run on batteries, they have a short flight time, in addition a drone shade tarp requires a device to prevent them from crashing.

A drone is a general term for an airplane or helicopter-type unmanned aerial vehicle (UAV) that can be flown and controlled by radio control without a pilot. Based on a quadcopter with four propellers, one pair of propellers facing diagonally rotates clockwise and the other pair rotates counterclockwise to maintain floating in a stationary state according to the laws of action and reaction, In other words, hovering is possible. Drones are categorized into bicopters, quadcopters, hexacopters, and octocopters according to the number of propeller drive body.

A drone consists of an ESC (electronic speed controller), FCS (flight control system), computer and controller, battery, GPS sensor, motors and propellers, etc. The ESC is an electronic speed controller that regulates the speed of the motor by changing the shape of the current and controlling the frequency. The FCS is the brain of the drone and has sensors to detect rotation, acceleration, and air pressure.

DESCRIPTION OF EMBODIMENTS

Technical Problem

In order to solve the above problems, the present invention attempts to provide various structures and methods for combining drones into an ad balloon frame with a cover portion and with a frame support made of a lightweight and strong material to provide rigidity to the ad balloon frame, since the drone is mounted on the ad balloon frame and the ad balloon frame needs to be moved according to the drone.

Solution to Problem

In order to solve the above-mentioned problems, the drone shade tarp is floated in the air, or the drone shade tarp is moved in the air and is settled on a rope or wire, and then the cover drone is settled on the lattice-like inner frame of drone shade tarp, so that the drone shade tarp can be easily installed and broken down, and the safety is enhanced by ensuring that the ad balloon frame made of vinyl cylinder and a buffer member collide in the event of a fall.

Advantageous Effects of Disclosure

In the drone shade tarp of the present invention, it is easy to install the drone shade tarp by moving a large ad balloon frame in the air, and we can solve safety problems by quickly breaking down the drone shade tarp when the weather is bad, and can provide efficient shade tarp by moving the drone shade tarp according to the direction of sunlight.

Also, in the present invention, the drone shade tarp can be assembled into an ad balloon frame and cover drone in the air, so it is easy to install large and heavy shade structures that use only air without using expensive gases such as helium.

In addition, the strength of ad balloon frame is increased by forming a groove in the ad balloon frame and inserting in a groove a rigid frame support, which helps a lot in the stable movement of the ad balloon frame and the fixation of the drone, and also helps to obtain the lift of a drone by enabling air circulation by the cross-shaped support on the cylindrical frame, usually these structures help the flight of the drone shade tarp.

Also, the cover drones of the present invention can be easily attached to the drone shade tarp in the air by using electromagnets or the like, therefore shade tarp can be effectively formed.

MODE OF DISCLOSURE

Figure 1:
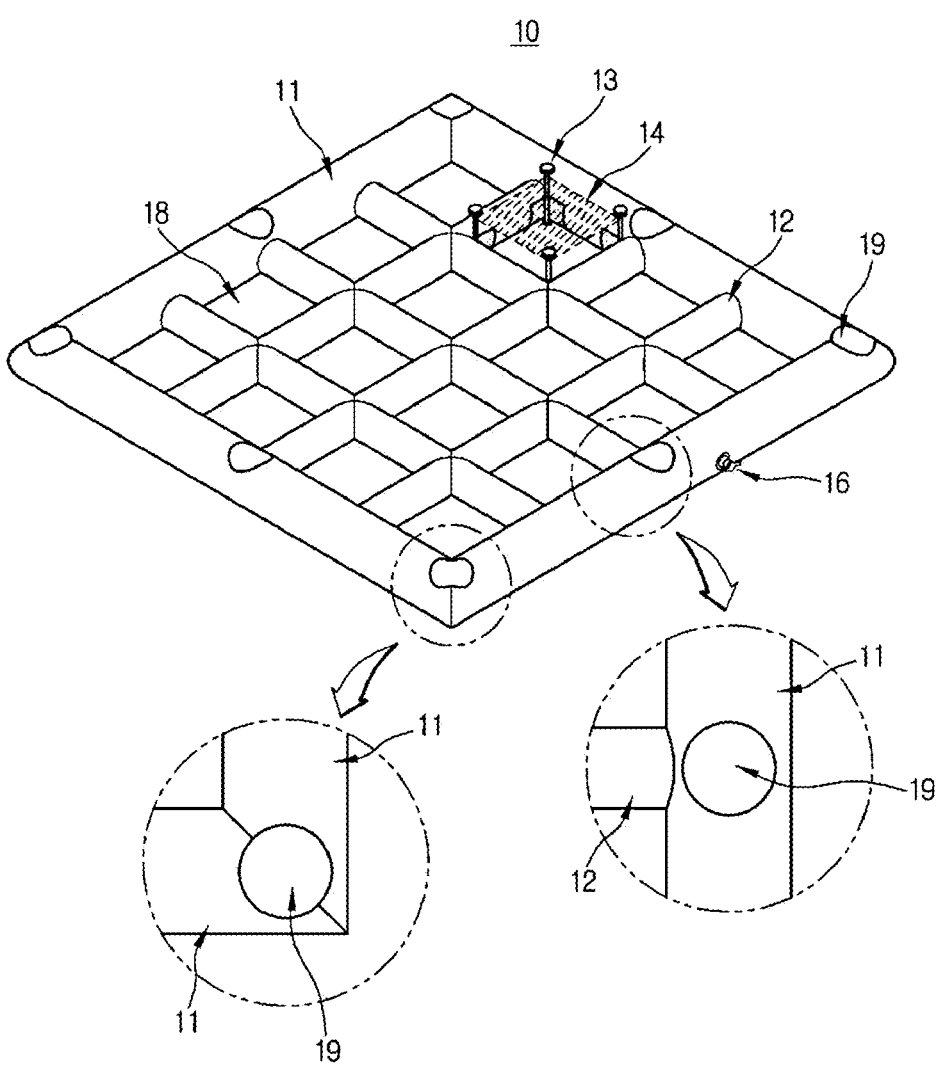
FIG. 1 is a view illustrating a advertising balloon frame (10) with a cover portion (14) and the hole (19) where the drone's propeller drive body (42) is installed.

Hereinafter, It is described in detail with reference to the attached drawings.

The invention includes the structure in which the ad balloon frame has outer frames and latticed inner frames 12 with inner space 18, and The ad balloon frame 10 includes various shapes such as a circle and a triangle. Also the material of the cover portion 14 may include conventional cloth or vinyl, UV protection film, or a fine-meshed net. Furthermore, the ad balloon frame has the advantage of not having much difficulty in manufacturing because it can make various shapes and structures using fabric (including vinyl) and adhesives.

The ad balloon frame 10 usually uses low-cost air, but when light gases such as helium and hydrogen are used, they reduce the overall weight of the drone shade tarp, which can reduce the drone's battery consumption.

In the drone shade tarp of the present invention, the ad balloon frame 10 consists of an outer frame 11 and a lattice-like inner frame 12, and the ad balloon frame 10 is made of vinyl cylinder filled with air flowing through injection hole 16.

Also, The frame 10 may have a double structure surrounding the cylindrical vinyl therein with cloth or vinyl.

Depending on the size of the frame 10, a plurality of drones 40 or a plurality of propeller driving bodies 42 that are even with one drone body 41 can be installed on the frame above, and In this case, even if it is not specifically stated in the detailed description or drawing, It goes without saying that the signal line and electric wire between the drone body 41 and the propeller driving body 42 are connected.

In addition, the center portion of the ad balloon frame may be provided with the part for mounting the drone body.

Another way of supplying electricity is to obtain electricity from the ground. In addition, the drone (or drone body) can controlled for the movement and stopping of the drone shade tarp on the ground by adjusting the remote control.

If necessary, the drone can be installed inside the frame 10 for safety and appearance reasons. The inside of the cylindrical frame 55 that is installed inside the frame 10 and houses the propeller drive body 42 is equipped with a cross-shaped support 57 for air to flow, and the lower part of the cylindrical frame 55 may be provided with a buffer member 58 to prevent impact in the event of a crash.

Figure 2:
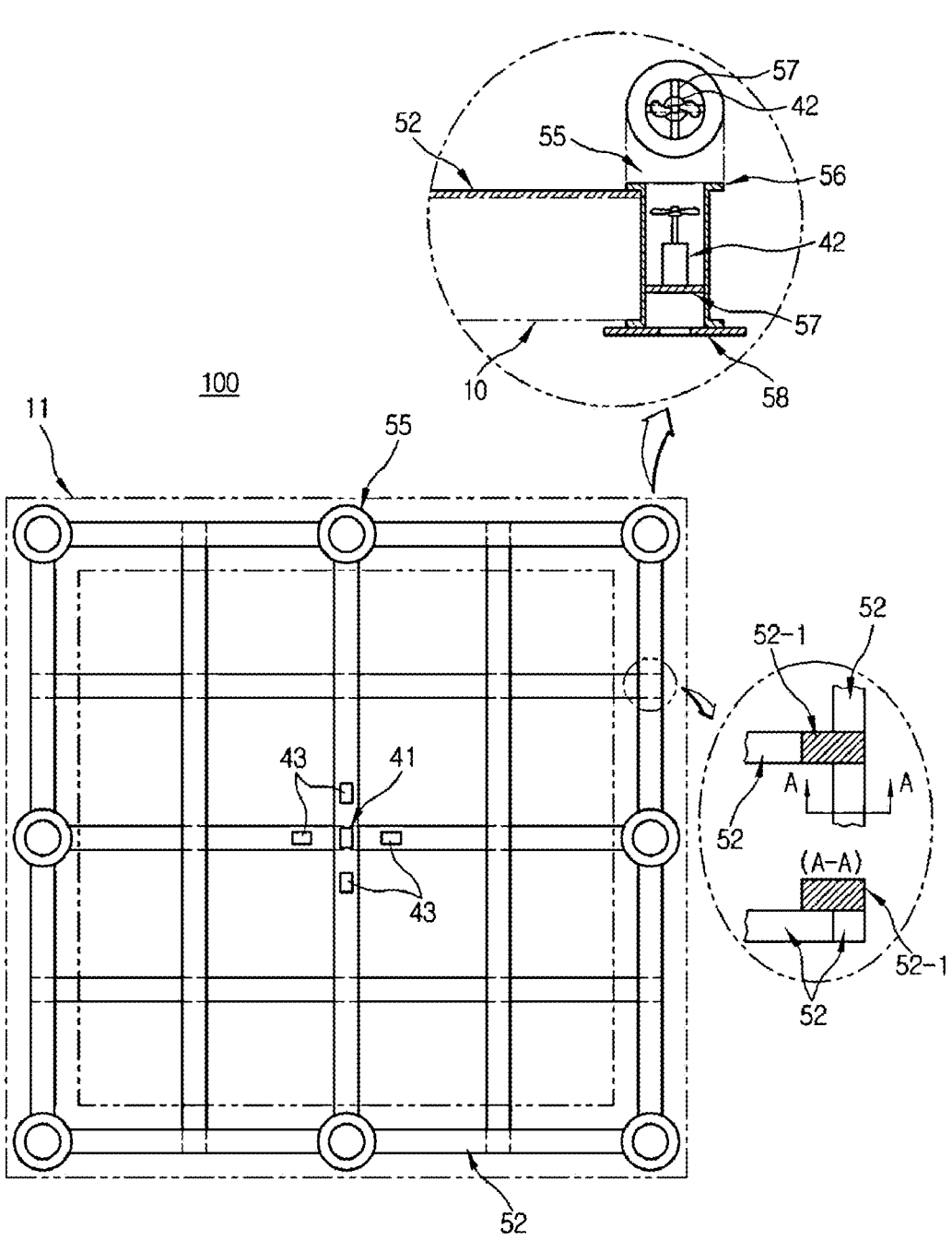
FIG. 2 is a view illustrating a drone shade tarp (100) connecting cylindrical frames (55) to frame supports (52) that are installed on the advertising balloon frame (10) of FIG. 1.

Referring to FIGS. 1 and 2, the frame 10 consists of an outer frame 11 and an inner frame 12, wherein the frame 10 is made of a plurality of tubes assembled from a vinyl material that is inflated by blowing air into a single injection hole 16, The frame 10, outer frame 11 and inner frame 12 expands one after another.

A drone body 41 and a plurality of propeller drive body 42 are installed on the frame 10, typically the body 41 is installed in the center of the frame 10, and the propeller drive body 42 may be installed on the outer frame.

In particular, it is desirable to install the propeller drive body 42 inside the frame 10 so that it is not visible to people for safety and aesthetic reasons, and for this purpose, a plurality of holes 19 are formed in the outer frame 11 so that a cylindrical frame 55 housing the propeller drive body 42 is inserted inside the holes 19, and when air is blown into the frame 10, the cylindrical frame 55 positioned inside the holes 19 can be fixed in close contact with the outer frame 11.

The cylindrical frame 55 has a cross-shaped support 57 to fix the propeller drive body 42, and flanges 56 are formed at the top and bottom of the cylindrical frame 55 so that the frame 10 can be sandwiched between the top and bottom flanges 56 when inflated, and the flanges can be fixed to the frame 10.

Here, the cylindrical frame 55 may be made of lightweight aluminum. Furthermore, the bottom flange of the cylindrical frame 55 may be attached with a buffer member 58, such as a donut-shaped styrofoam or an air tube, for safety in the event of the frame fall.

FIG. 1 shows a drone shade tarp can be formed by cover portions 14 (just one is shown in FIG. 1 for convenience) that rise and fall along guide bars 13 that are installed on each of the four corners of the latticed inner frame 12 forming a plurality of inner space 18.

Figure 3:
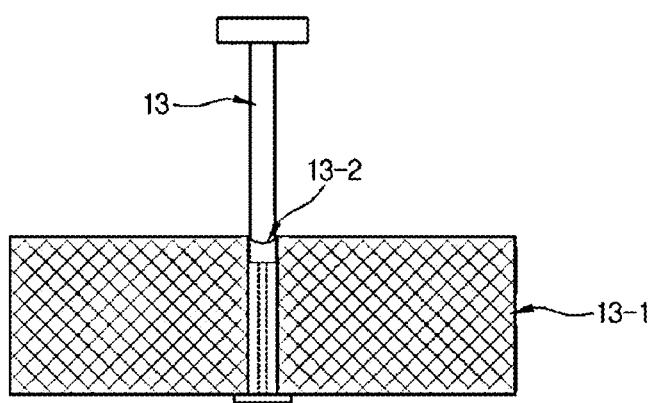
FIG. 3 is a view illustrating a guide bar to guide the rise and fall of a cover portion (14) and to restrict height rise of cover portion (14).

As shown in FIG. 3, the guide bar 13 may be used by screwing together the upper guide bar and the lower guide bar.

Specifically the guide bar 13 may be assembled by first inserting the upper guide bar into the through-hole formed in the guide bar insertion portion 13-2 formed in the attachment pad 13-1 and then screwing together the lower guide bar.

The attachment pad 13-1 may be connected to the inner frame using an adhesive or a staple, and the flange of the upper guide bar restricts the rise of the cover portion 14, and the flange of the lower guide bar prevents the guide bar 13 from separating as the cover portion 14 goes up.

Also, if winds blowing below the frame 10 rise through the inner space 18, the cover portion 14 is guided to the guide bar 13 and rises, and if there is no wind, the cover portion 14 is guided to the guide bar 13 by its own weight and falls.

Also in a simpler structure, the cover portion 14 is fixed to the rectangular ad balloon frame with four inner frames 12 by means of a staple without a guide bar 13, and a wire connected to an electric vehicle or an external power supply system is connected to the drone body, and the drone shade tarp can easily form a shade tarp in the air even with a small battery capacity. In addition, the drone shade tarp can be easily stored in the trunk of a car by deflating the ad balloon frame and removing the propeller drive body 42 and the cylindrical frame 55.

Also in FIG. 2, frame supports 52 made of aluminum are installed on the top of the ad balloon frame 10, which can be assembled with the cylindrical frame 55 through the coupling member 52-1, or the frame supports 52 may be assembled with the coupling member 52-1 by a bolt or the like.

The frame support 52 is installed on top of the frame 10 and serves to fix the frame 10 so that the frame support 52 integrate with with the frame 10 when a drone flies, and can be a thick plate made of aluminum or a hollow square-shaped structural material to give great rigidity to the whole frame.

Here, a hollow square-shaped structural material may be selected for weight reduction.

In addition, the drone body 41, which controls the movement and elevation of the propeller drive bodies 42, can be installed in the central part of the frame 10, and batteries 43 can also be installed around it in consideration of the center of gravity, so that they can be operated for a long time in the air, and if necessary, a configurations that supply electricity by connecting with the electric wire 21 on the ground can be added.

On the other hand, since such a drone shade tarp affects power consumption and the lifespan of the drone when used for a long time, after rope or net is installed in the air using a ground structure, a tree, or an installed vertical support, the drone shade tarp can be formed by flying the drone shade tarp and seating it on the rope or the net above.

It is also possible to make it large by seating multiple drone shade tarp on the rope or the net above.

In this case, it is easy to install and dismantle the shade tarp, and it is economical and safe because it is not necessary to operate the drone continuously.

Figure 4:
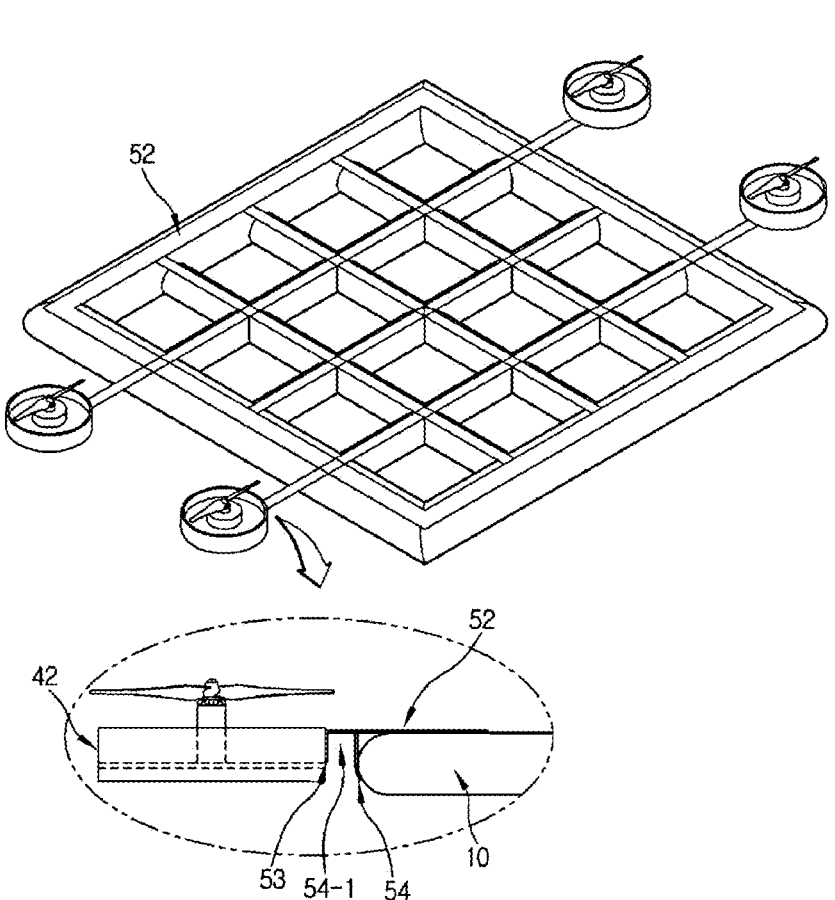
FIG. 4 is a view illustrating the drone shade tarp (200) with drones attached to frame supports (52) directly, according to an embodiment of the present invention.

FIG. 4 shows another embodiment, the drone shade tarp 200, wherein the propeller drive body 42 is located outside of the frame 10 rather than in the hole 19 of the frame 10, and the propeller drive 42 is coupled and secured to a coupling portion 53 formed on an elongated portion of the frame support 52, and the frame 10 may also be secured in a wrap-around manner by a support portion 54, which consists of a straight line and a round (circle).

Here, the coupling portion 53 and the support portion 54 are installed in the elongated portion of the frame support 52 by welding, bolting, or the like, and a rope groove 54-1 is formed between the coupling portion 53 and the support portion 54.

The propeller drive body of FIG. 4 can be attached to a protective shield made of a balloon material, which is cylindrical in shape and has holes at the top and bottom for a smooth flow of air. Thus, the drone shade tarp may be safe in the event of a crash.

Figure 5:
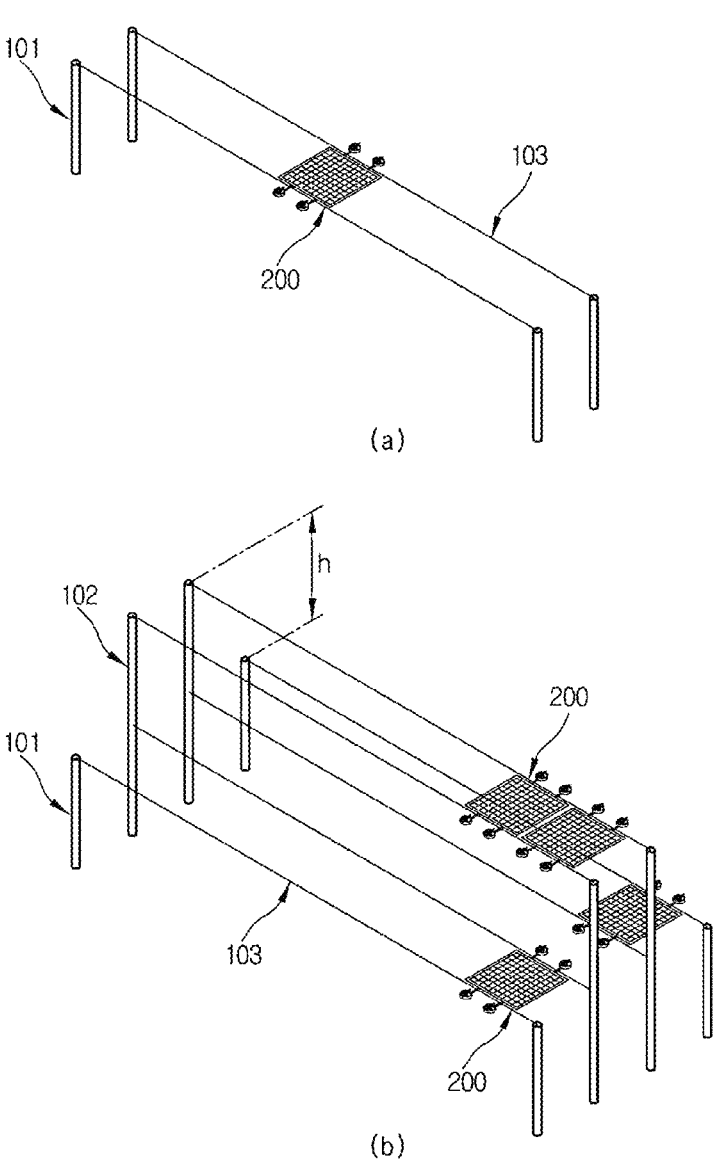
FIG. 5 is a view illustrating the formation of a large scale shade tarp setting up a drone shade tarp 200 on the rope in succession next to the drone shade tarp 200

The drone shade tarp 200 of FIG. 4 comprises rope grooves 54-1 for landing on a rope 103 secured by the lower vertical support 101 shown in FIG. 5(a), When a plurality of the drone shade 200 is landed on the rope, the landing height of the drone shade 200 can be varied by the height difference H of the rope being secured by the lower vertical support 101 and the upper vertical support 102 as shown in FIG. 5(B).

By the height difference H, large-scale shade tarp can be installed without the overlap or interference of drone shade tarps 200

Figure 6:
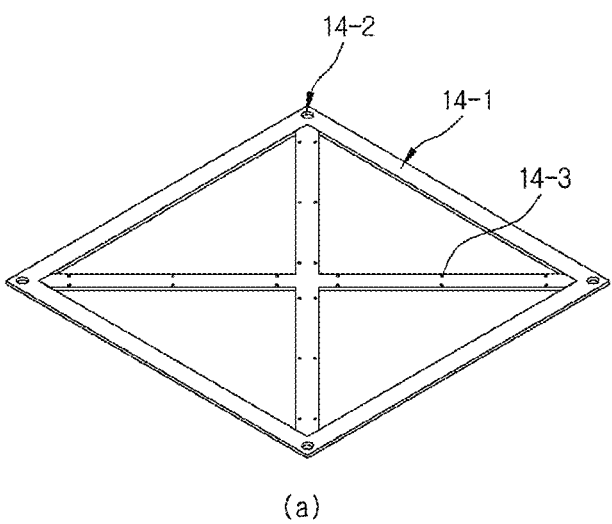
FIG. 6 is a view illustrating another cover portion 14, namely, a triangular cover portion 14-5 installed on a drone shade 100, 200, according to an embodiment of the present invention.
Figure 6:
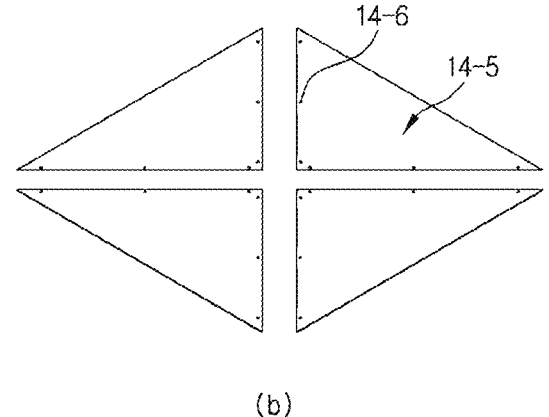
Figure 7:
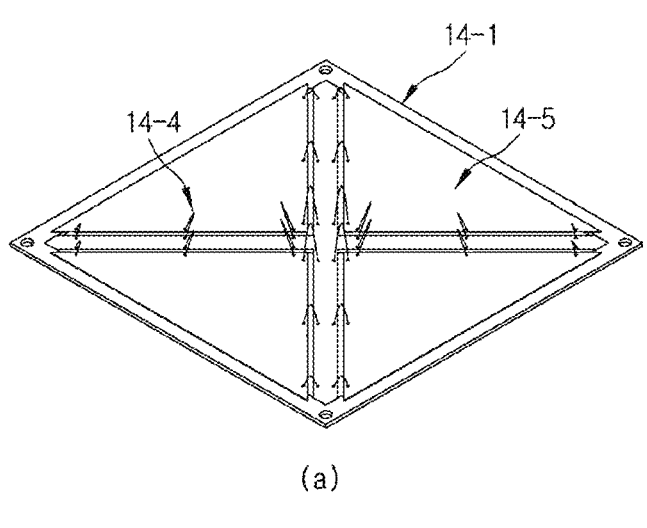
FIG. 7 is a view illustrating triangular cover portion of FIG. 6 being lifted up by the wind.
Figure 7:
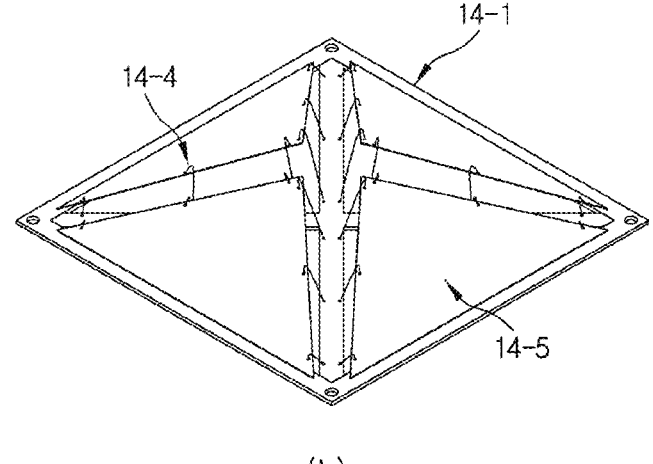

Referring to FIGS. 6 and 7, as one embodiment of a cover portion 14 used for a drone shade tarp 100, 200 having a guide bars 13, a cover frame 14-1 having a guide hole 14-2 and a frame cord holes 14-3 and a triangular cover parts 14-5 having a cover cord holes 14-6 are assembled.

The bottom side of the triangular cover part 14-5 is fixed to the cover frame 14-1, both sides are connected and fixed by a cord 14-4 connecting the frame cord hole 14-3 of the cover frame 14-1 and the cover cord hole 14-6 of the triangular cover part 14-5, and the closer to the peak of the triangular cover part 14-5, the longer the cord 14-4 is connected, and when the wind blows, it opens up more toward the vertex, allowing more wind to pass through.

At this time, the guide bar 13 may be inserted into the guide hole 14-2 to raise the cover frame 14-1, or if the head of the guide bar (not shown) is installed just above the cover frame 14-1 to limit the rise of the cover frame 14-1, namely, if the cover frame 14-1 is fixed, only the triangular cover part 14-5 may be opened to pass the wind.

Figure 8:
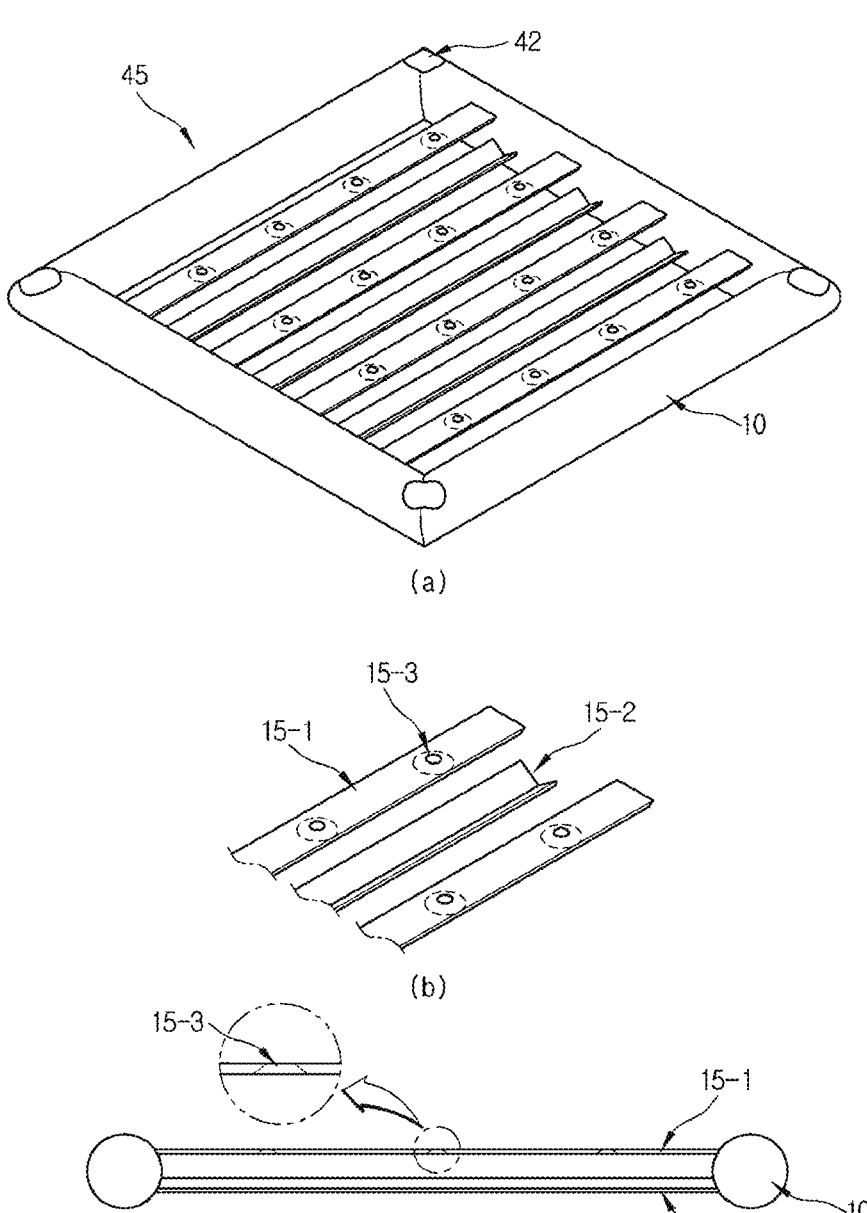
FIG. 8 is a view illustrating integral two-stage cover portion seated on the inner frame 12 of the drone shade tarp 100, 200, according to an embodiment of the present invention.

FIG. 8 is about a cover drone 45 that is seated on the lattice-like inner frame 12 of the above drone shade tarps 100 and 200 and provides a cover portion. Instead of the cover portion 14 made up of the guide bar 13 of FIG. 1, the cover drone that moves upward on the lattice-like inner frame 12 is seated on the inner frame 12 to form a shade tarp.

Specifically, it is about the embodiment of a cover drone with an integrated two-stage cover portion, and a flat upper cover piece 15-1 and a 'V' shape lower cover piece 15-2 communicating with the frame 10 of the cover drone are installed up and down, and a conical ventilation holes 15-3 through which air can pass is formed in the upper cover piece 15-1.

When the wind blows from below, the wind is divided on both sides of the lower cover piece 15-2, and the wind that comes to the upper cover piece 15-1 escapes between the upper cover piece 15-1, and the wind that comes to the upper cover piece 15-1 also escapes to the conical ventilation hole 15-3, so that the upper cover piece 15-1 can be stably fixed.

Here, the upper cover piece 15-1 and the lower cover piece 15-2 can be completed with a single air injection without additional work by communicating with the frame 10.

Figure 9:
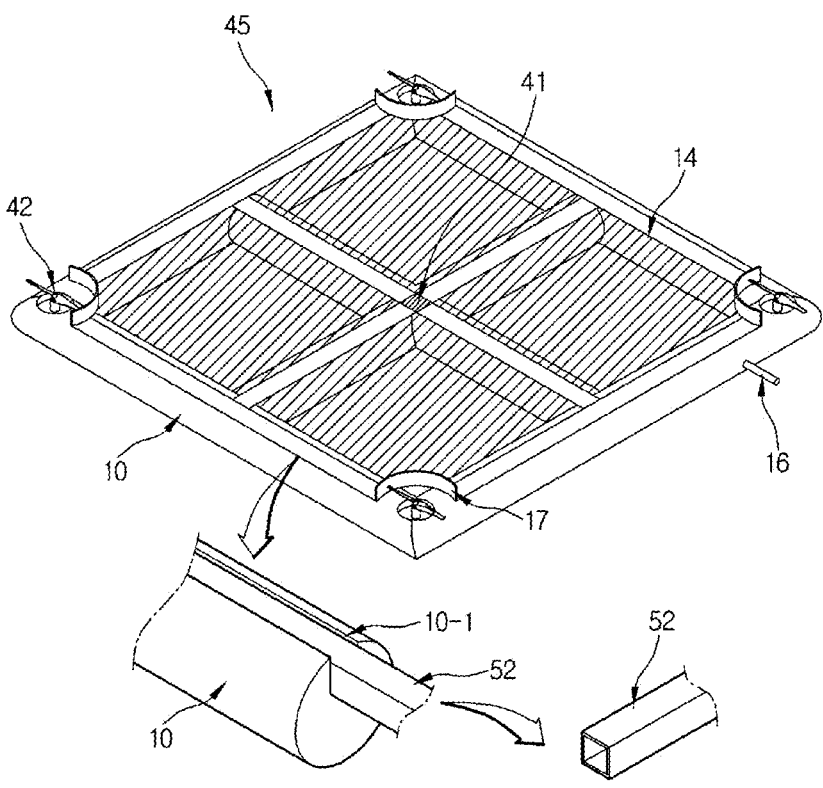
FIG. 9 is a view illustrating a cover drone 45 with frame supports 52 installed in grooves in the frame 10 and a windshield 17.

FIG. 9 shows another embodiment of the cover drone 45, wherein the propellers of the propeller drive body 42 rotate within the cylindrical frame as in other embodiments, but here the propellers of the propeller drive body 42 rotate on top of the cylindrical frame (not shown) to provide more lift and propulsion.

However, to prevent interference with rotating propellers and to prevent the influence of the wind on the cover portion 14, the windshield 17 can be installed over the frame support 52 as shown in FIG. 9. Here, the cover portion 14 covers the inner space 18 of the inner frame, and the shape of the cover portion is square, but is circular in windshield side to avoid interference with the windshield 17.

Although not shown in FIG. 9, a lower cover portion identical to the cover portion 14 may also be installed on the lower part of the frame.

Furthermore, the frame supports 52 are inserted and secured in mating grooves 10-1 on the upper surface of the frame 10, wherein the mating grooves 10-1 have a depth at which the frame support 52 is not buried in the groove, wherein these frame supports 52 are hollow square aluminum bars, which are lightweight but impart stiffness to the ad balloon frame 10 during upward movement by the drone, and cover portions may be installed in each of the inner space (drawing number not shown) on the top of the latticed frame.

Figure 10:
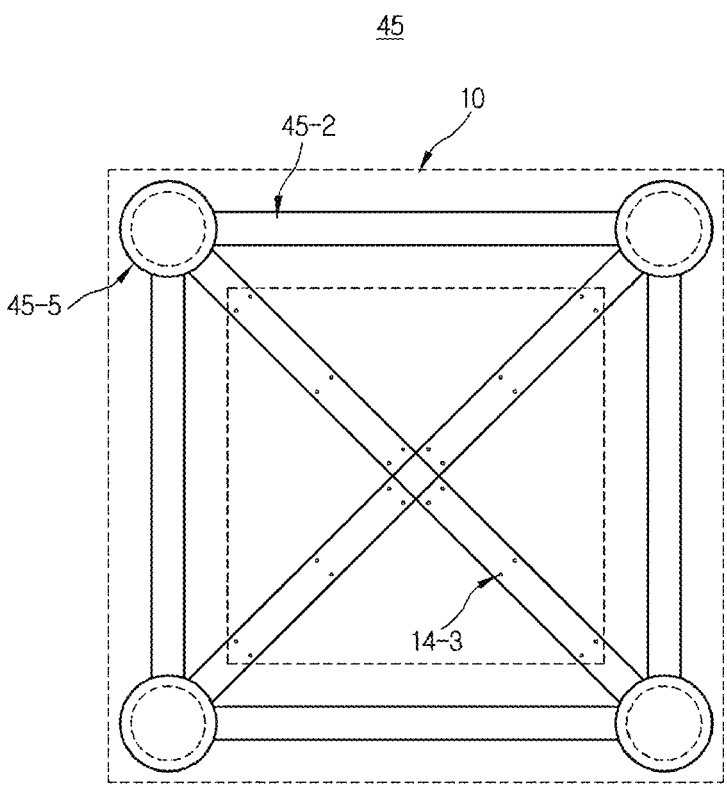
FIG. 10 is a view illustrating another cover drone 45 that seat on the latticed inner frame 12 of the drone shade tarp 100, 200, according to an embodiment of the present invention.

FIG. 10 also relates to a cover drone 45 that is seated on the lattice-like inner frame 12 of the above drone shade tarps 100 and 200 and provides a cover portion.

The cover frame 45-2, consisting of four sides of the square and two diagonals, is shown to be coupled to the cylindrical frame 45-5 at four vertices.

In addition, a shade tarp is formed by four triangular cover parts installed in the inner space 18 of the cover portion frame 45-2.

Since the cylindrical frame 45-5 is the same as the cylindrical frame 55 of FIG. 2, a detailed description thereof is omitted, and although the four triangular cover parts are not shown, they are the same as those of FIG. 6(b), and thus are omitted.

Additionally, as shown in FIG. 1, the holes 19 is formed at the four corners of the frame 10, and cylindrical frame 45-5 combined with cover portion frame 45-2 is inserted into the holes, and if gas is injected, the frame 10 expands and is fixed between the flanges 56 of the cylindrical frame.

In addition, the operation of the above triangular cover parts are the same as that of FIG. 7, that is, the bottom sides of the triangular cover parts is fixed to the frame 10, and the other two sides are connected by cords 14-4 connecting the cord holes 14-3 of the cover portion frame 45-2 and the cord holes 14-6 of the triangular cover parts.

In addition, the closer to the vertex of the triangular cover part 14-5, the longer the cord 14-4 is connected, and when the wind blows, the vertex side widens more so that the wind passes better.

Also, the body 41 of the drone 40 may be properly installed in the center of the cover portion frame 45-2 or on the frame 10. Even at this time, the battery 43 is appropriately dispersed so that the center of gravity of the cover drone 45 is balanced.

Figure 11:
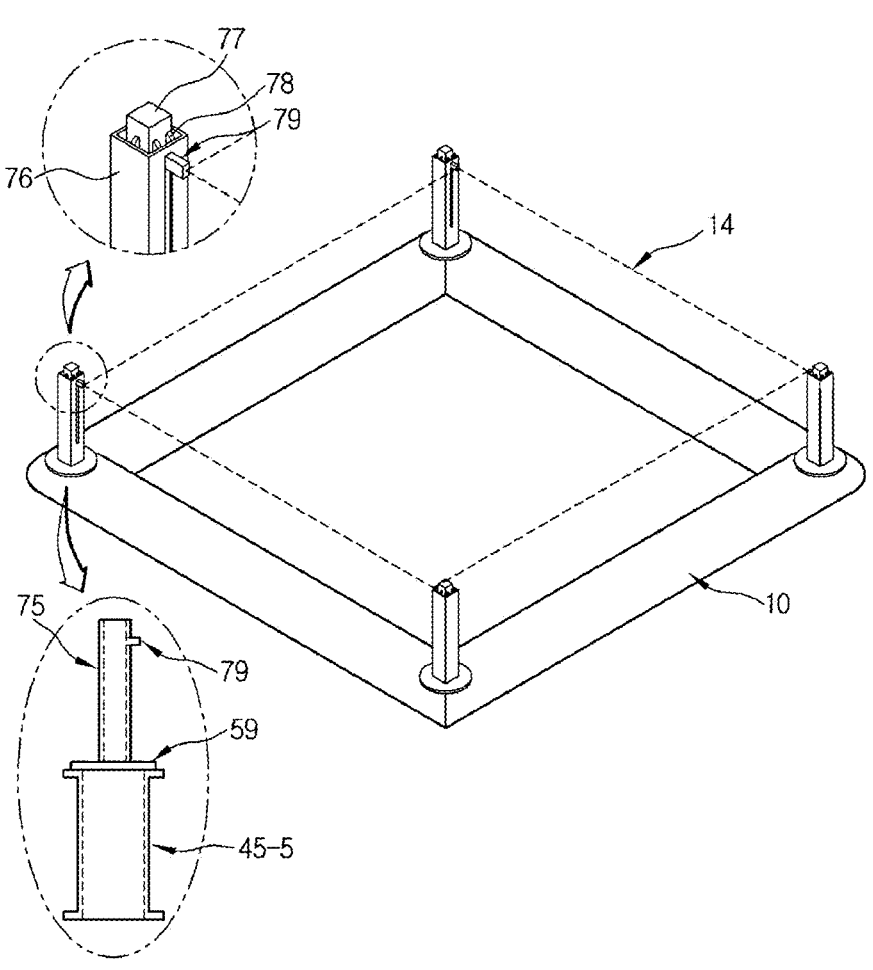
FIG. 11 is a view illustrating another embodiment of cover drone 45 of FIG. 10.

Referring now to FIG. 11, another embodiment of the cover drone 45 includes a cross-shaped top support 59 mounted on top of the cylindrical frame, and a hollow square bar 75 is attached on cross-shaped top support 59.

One side of the hollow square bar 75 is formed a long groove, and a body 77 guided to the roller 78 inside the hollow square bar 75 is attached to a cover connecting bar 79 combining the cover portion 14, and the body 77 ascends and descends with the cover portion 14.

To explain the operation, after the cover drone 45 is landed on the inner frame 12, when the cover portion 14 of the cover drone 45 rises in the case of wind, the body 77 attaching to cover connecting bar 79 rises smoothly on the inner wall of the hollow square bar 75 by the roller 78, and when there is no wind, the body 77 descends with the cover portion 14 by the self-weight of the body 77.

It is also possible, although not shown, that the cover connecting bar 79 may extend through said long groove and into the interior of said hollow square bar 75, without the body 77 and roller 78, to guide the cover portion 14 up and down along said long groove.

Figure 24:
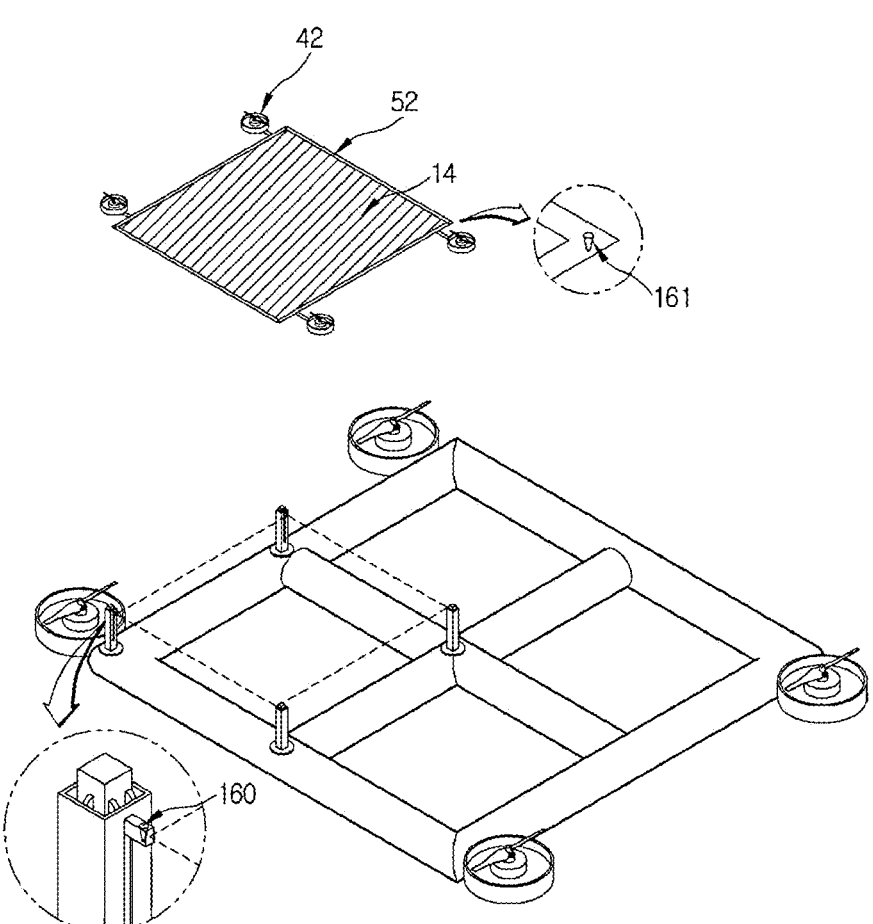
FIG. 24 is a view illustrating another embodiment in which the cover portion of FIG. 11 is installed by a cover drone.
Figure 25:
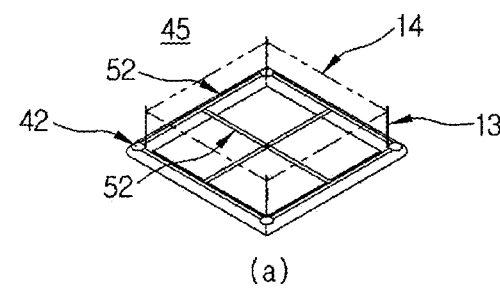
FIG. 25 is a view illustrating a plurality of cover drones joined together to form a drone shade tarp.
Figure 25:
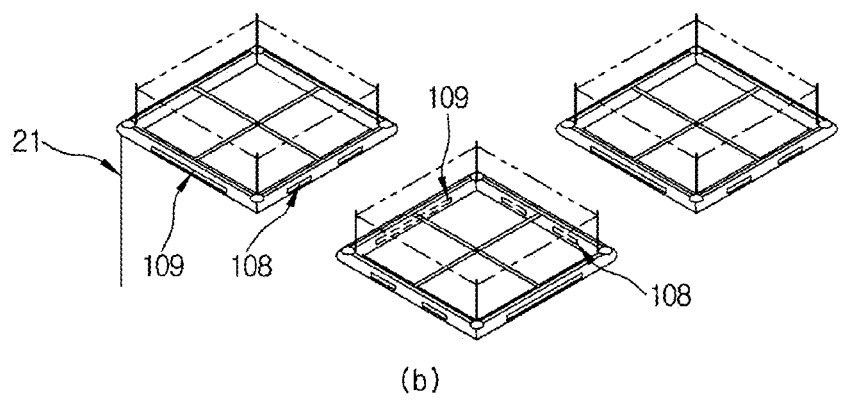
Figure 25:
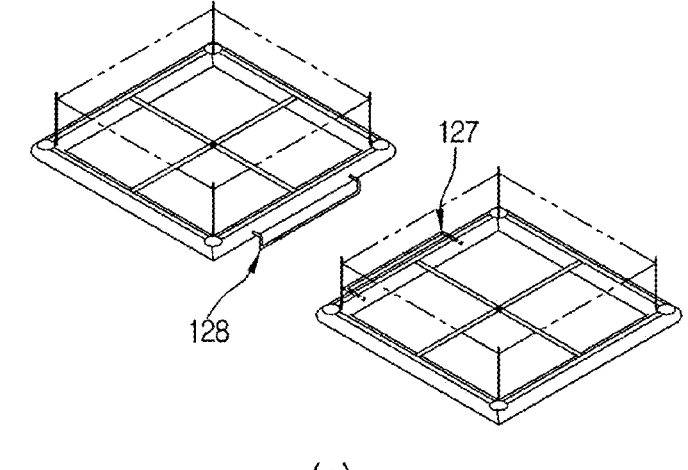
Figure 26:
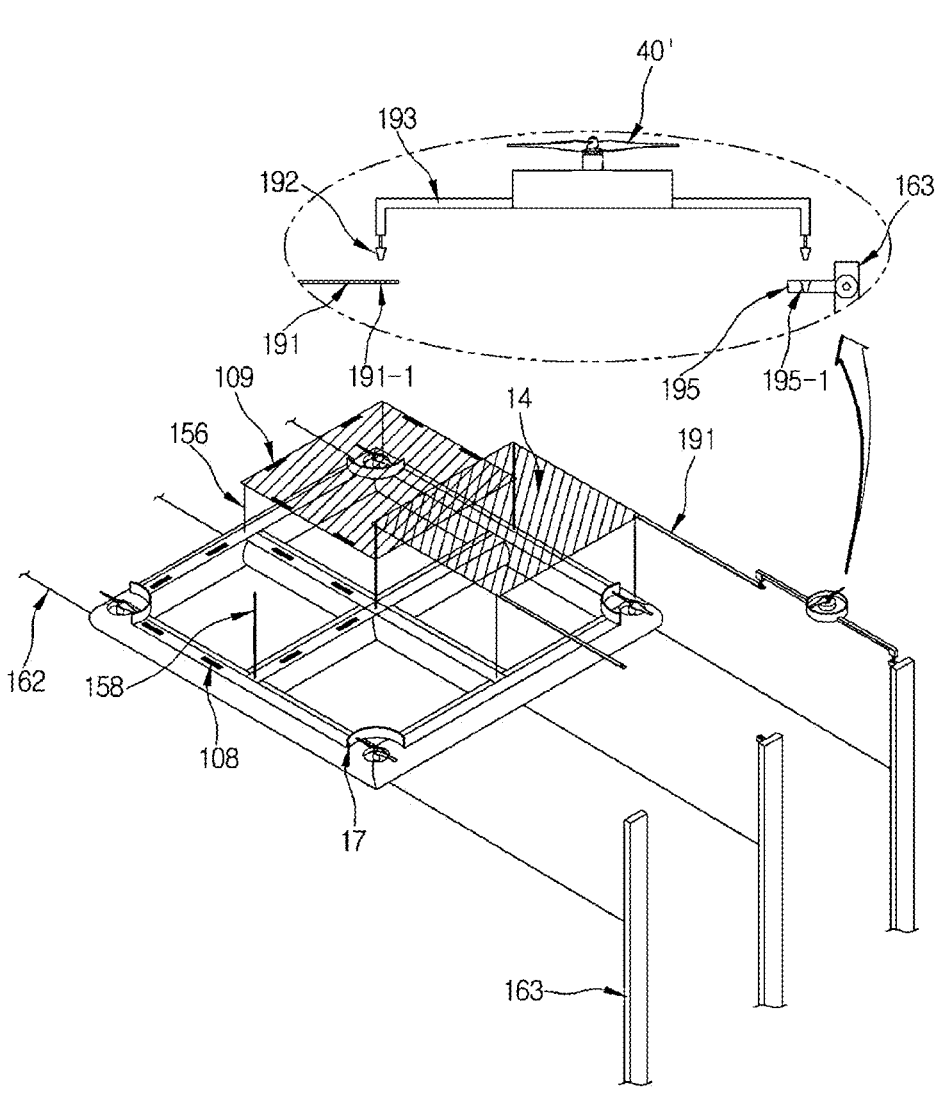
FIG. 26 is a view illustrating an alternative embodiment of the cover drone of FIG. 9, where a bars 191 installed in the one-sided cover portion is fixedly connected to vertical supports 163 through the drone.

Such a configuration may also be applied to the cover connecting bar 79 with the receiving groove 160 in FIG. 24, and to the cover connecting bar 195 with the magnetic conical hole 195-1 in FIG. 26.

Also, although not shown in FIG. 11, additional frame supports can be installed in the form of a cross to the frame support 52 installed on top of the frame 10 to prevent the cover portion from sagging under the frame 10.

Figure 12:
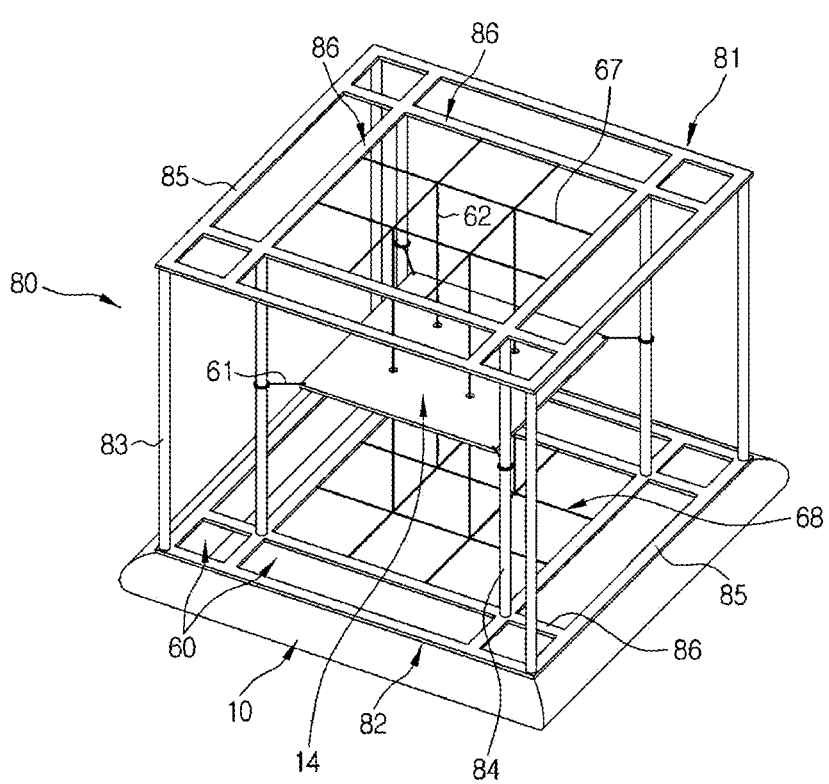
FIG. 12 is a view illustrating another embodiment of the cover drone of FIG. 10. namely a two-stage frame cover drone.

FIG. 12 relates to other embodiment of the cover drone 45, a two-stage frame cover 80, which is described as: firstly, the upper and lower frames 81, 82 comprise a two rectangular members 85 installed on the upper side of the frame 10 and two horizontal members 86 are installed inside the rectangular member 85 in the longitudinal and transverse directions.

Also the upper and lower frames 81, 82 are installed vertically and spaced apart by four outer vertical supports (83) and four inner vertical supports (84) which are erected at the intersection of horizontal supports (86)

Although not specifically shown here, a cross-shaped top support 59 is installed on the top of the cylindrical frame 45-5 installed at the corners of the frame 10, and an outer vertical support 83 is erected thereon.

In addition, upper and lower frames 81 and 82 are installed with upper and lower mesh nets 67 and 68, respectively, and a plurality of vertical cords 62 piercing through the center part of the cover portion 14 are fixed to the upper and lower mesh nets to guide to the rise and fall of the cover portion 14.

Also the four corners of the cover portion 14 are supported by horizontal cords 61 made of rings and cords, and horizontal cords 61 keep the cover portion 14 flat in rising and falling of the cover portion 14.

If the cover portion 14 of FIG. 12 may be widen, the number of vertical cords 62 may also increase.

In addition, the border portion 60 which the cover portion 14 does not form a shade attaches an ultraviolet film, a thin cloth, or the like, to form a shade.

However, the border portion 60 should not be wide to prevent the posture from being unstable due to wind pressure or the like.

Figure 13:
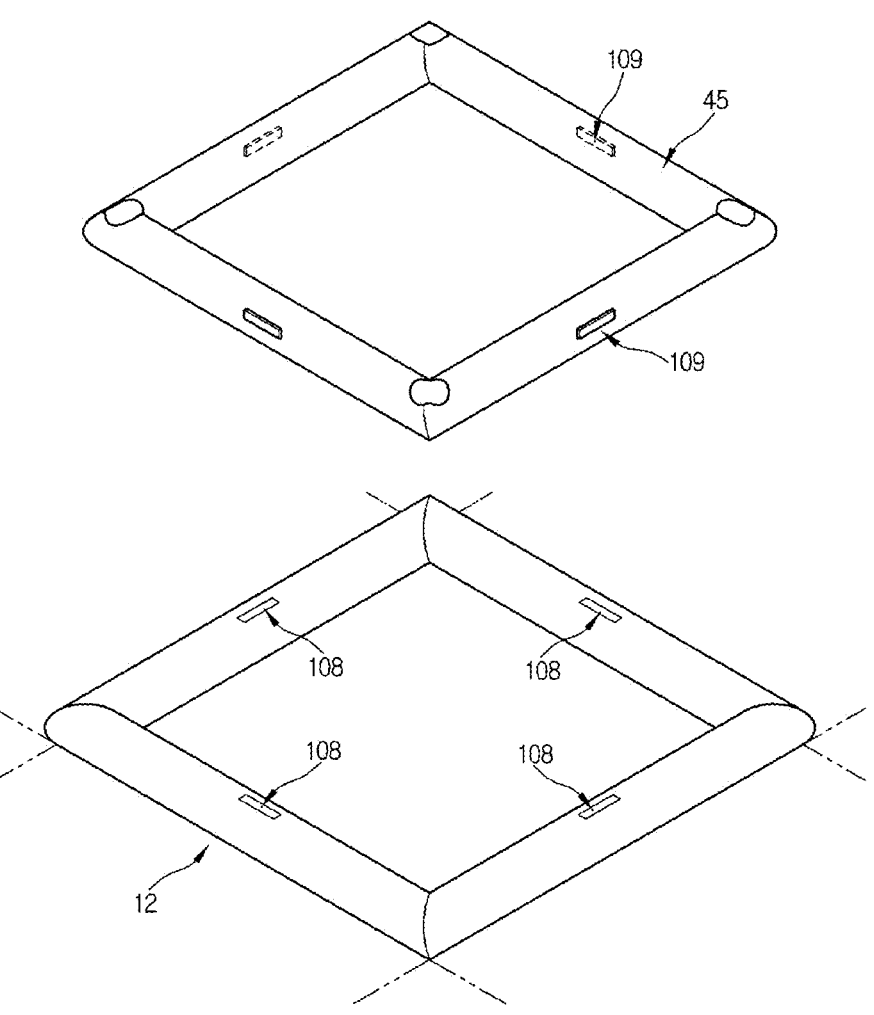
FIG. 13 is a view illustrating a means of combining for securing the cover drone 45 to the latticed inner frame 12 of the frame 10.

Referring to FIG. 13, the cover drone 45 may be provided with connecting means for securing the cover drone 45 to the latticed inner frame 12 of the frame 10.

That is, by attaching four electromagnets 108 located on the upper side of the center portion of each of the four inner sides of the inner frame 12, and four thin sheet of irons 109 located on the lower side of the center portion of each of the four outer sides of the cover drone 45 at corresponding positions to be coupled with said electromagnets 108, The electromagnet is operated to engage with the thin sheet of irons 109 of the cover drone 45 when the cover drone 45 is installed, and the electromagnet is turned off when the cover drone 45 is removed so that the cover drone 45 can be easily removed.

Furthermore, as shown in FIGS. 24(*a*), (*b*), a large shade tarp can be installed by simply joining the cover drones 45 together without the drone shade tarp 100, 200 having the frame 10.

Also electromagnets 108 or magnetic materials 109 such as iron sheets are installed in the center portion of the four outer sides of the cover drone 45, but electromagnets 108 are attached to the sides facing each other and magnetic materials 109 such as iron sheets are attached to the remaining two facing sides to keep the cover drones 45 together in the air, and when the drone is separated, the electromagnets are turned off to raise and move the drone.

Although not shown, the electromagnet can get electricity from the drone's battery, but it can also get electricity by a electric wire 21 from the ground.

In addition, in a plurality of cover drones 45, a centrally located cover drone may be supplied with electricity by a electric wire 21 connected from the ground, and said electricity may be supplied to other cover drones in the periphery, so electrical connection is required by the conductor connection configuration, for example, a groove electrode and a protruding electrode inserted therein can supply electricity to a coupling part (electromagnet and magnetic body) that joins the centrally located cover drone and the other cover drones in the periphery.

Although FIG. 24(*c*) shows only one accommodation part 127 and one protrusion part 128 for convenience, it is possible to install a accommodation part 127 at the electromagnet position and a protrusion part 128 at the iron sheet position in cover drones 45 as described above, also the cover drone 45 can be inserted and coupled by the weight of the cover drone 45 when the cover drones 45 is connected, and can be separated by the upward force of the drone when the cover drones 45 is released, so that the cover drones 45 can be continuously connected to form a large shade tarp.

Figure 14:
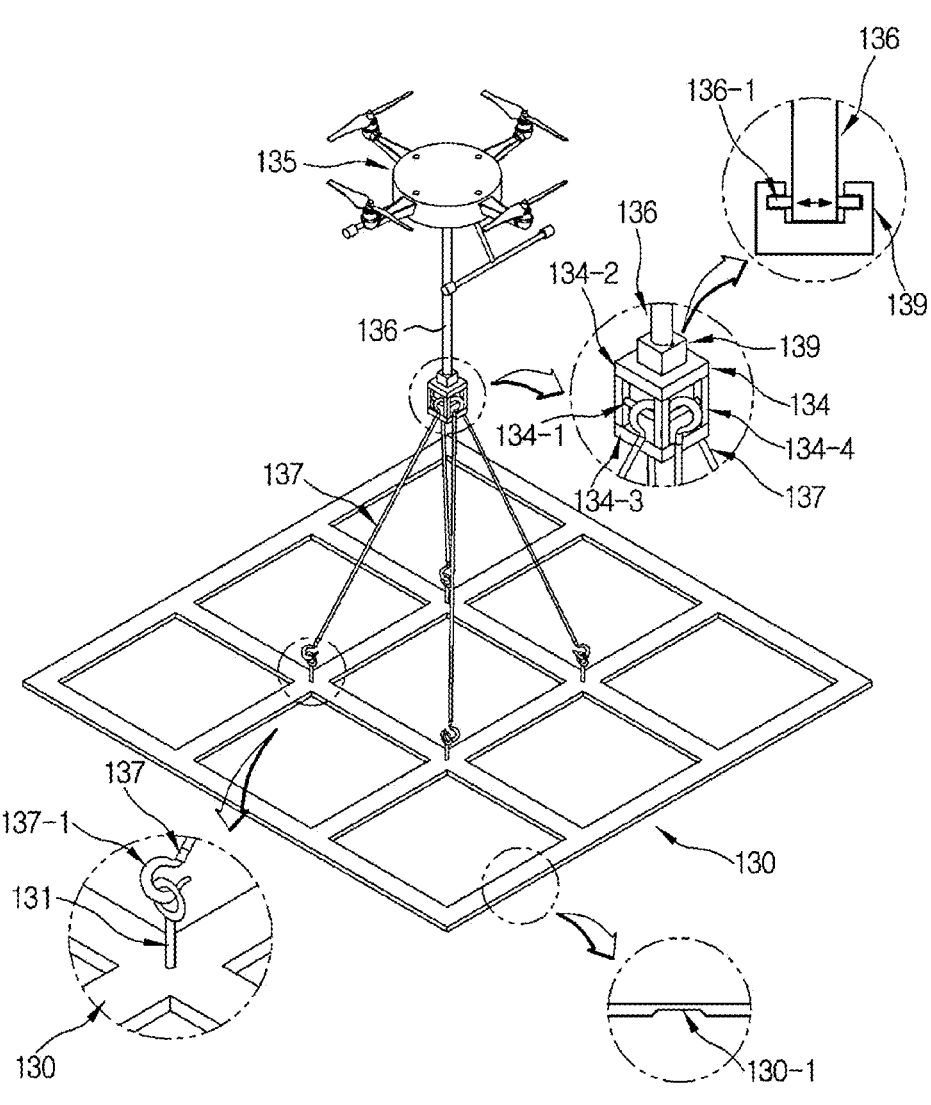
FIG. 14 is a view illustrating the coupling structure of the latticed frame 130 and the drone 135.

FIG. 14 shows other embodiment of using a lattice-like frame 130 without an ad balloon.

Eyebolts 131 are installed at four corners of the inner frame of the central portion of the lattice-like frame, and eyebolts are attached to four hooks 137-1 formed on one side of connecting member 137, and four hooks in the other side of the connecting member are attached to four retaining pins 134-1 of the connecting bracket 134.

Furthermore, the movable protrusions 136-1 of the engagement bar 136 coupled to the large drone 135 may be inserted into the horizontal grooves of the groove bracket 139 installed above the top bracket 134-2 of the connecting bracket.

Specifically, the groove bracket has two horizontal grooves on both side of the inside, such that movable protrusions of the engagement bar can be inserted into the horizontal grooves by protruding outwardly, and then the drone floats into the air and lands on a rope or a mesh net.

In this case, a groove 130-1 is formed in the lower part of the frame to allow the frame 130 to be seated over the rope or the mesh net.

After the frame 130 is seated, the hook 137-1 of the connecting member 137 can be separated from the eyebolt 131, and then the movable protrusion 136-1 of the engagement bar 136 is moved back to its original position, i.e., to the inside, and the large drone 135 is flies and moves.

The cover drone 45 can be moved upwardly to form a shade tarp on the lattice-like inner frame of the frame 130.

In addition, the movable protrusions 136-1 of the engagement bar 136 can be operated by hydraulic operation, etc.

Figure 15:
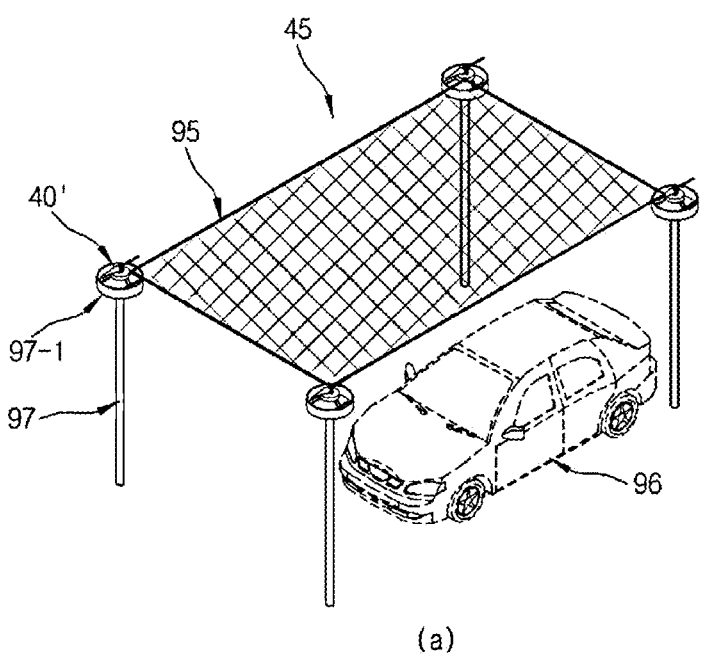
FIG. 15 is a view illustrating a cover drone that can be used as a simple parking facility.
Figure 15:
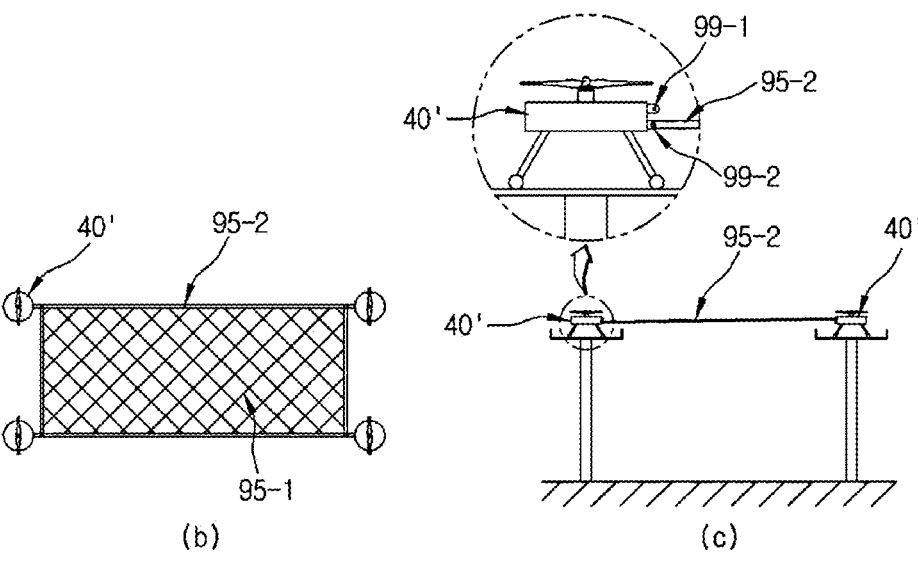

FIG. 15 shows a cover drone that can be used as a simple parking facility.

First, four vertical supports 97 equipped with drone landing parts 97-1 are installed, and four drones 40' are attached to the cover portion 95 that combines the cover rectangle frame 95-2 with the cover part 95-1, as shown in FIG. 15(*b*).

An upper hinge block 99-1 and a lower hinge block 99-2 are installed on one side of the drone 40'.

If the cover rectangle frame 95-2 is hinged to the lower hinge block (99-2) on the front drone (the front side of the car) and the upper hinge block (99-1) on the rear drone (the rear side of the car) respectively, the cover rectangle frame 95-2 is inclined by the height difference between the upper hinge block 99-1 and the lower hinge block 99-2.

In this state, if the cover drone 45 is moved into the air and seated on the drone landing parts 97-1, it can provide a shade tarp to the (electric) vehicle 96.

In addition, the cover portion 95 is inclined so that rainwater can flow down, so there is no water left in the cover portion.

In addition, if necessary, the drone's battery can be connected to the electric wire (not shown) of the vertical support 97 to provide minimal electricity to the electric vehicle, on the other hand, drones can get electricity from electric vehicle 96.

Drone 40' may operate as one controller, and may be replaced with one drone body 41 and four propeller drive bodies 42 instead of the drone 40' as needed.

Figure 16:
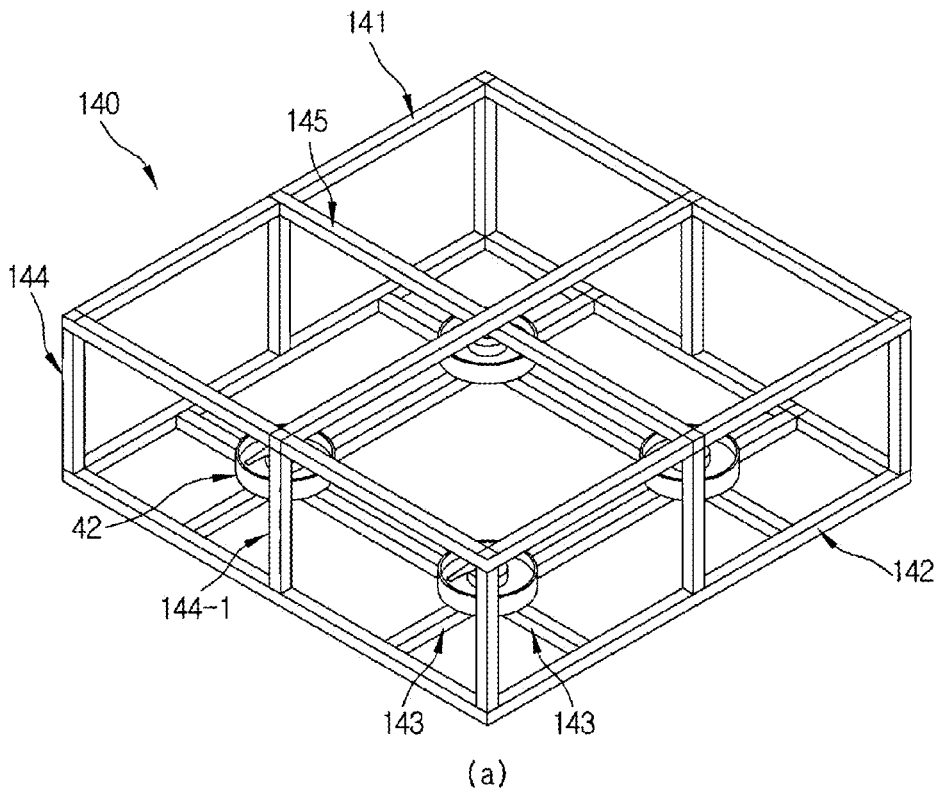
FIG. 16 is a view illustrating another embodiment of the cover drone.
Figure 16:
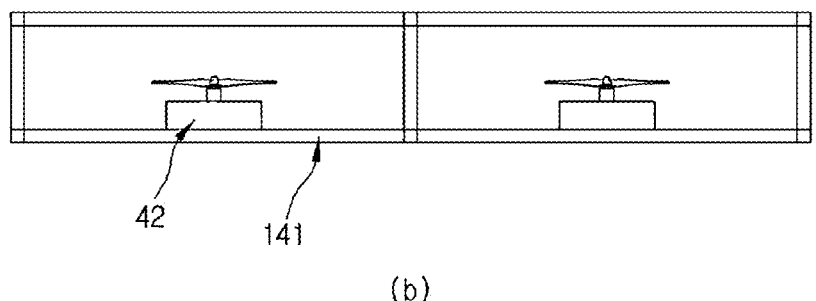

FIG. 16 is another embodiment of the cover drone 140, the upper part consists of an upper square frame 141 and a cross-shaped upper horizontal support 145, the lower part consists of a lower square frame 142 and a lower horizontal support 143 installed two each in transverse and longitudinal directions, and the upper and lower parts are installed vertically spaced apart and vertically by vertical rod 144 and central vertical rod 144-1.

In addition, a drone (or a propella drive body) is placed at the intersection of the lower horizontal support 143.

Although not shown in FIG. 16, the cover portion may be connected to the cords 156 at four corners of the upper square frame 141, and the cover portion may be prevented from sagging by the cross-shaped upper horizontal support 145.

Figure 17:
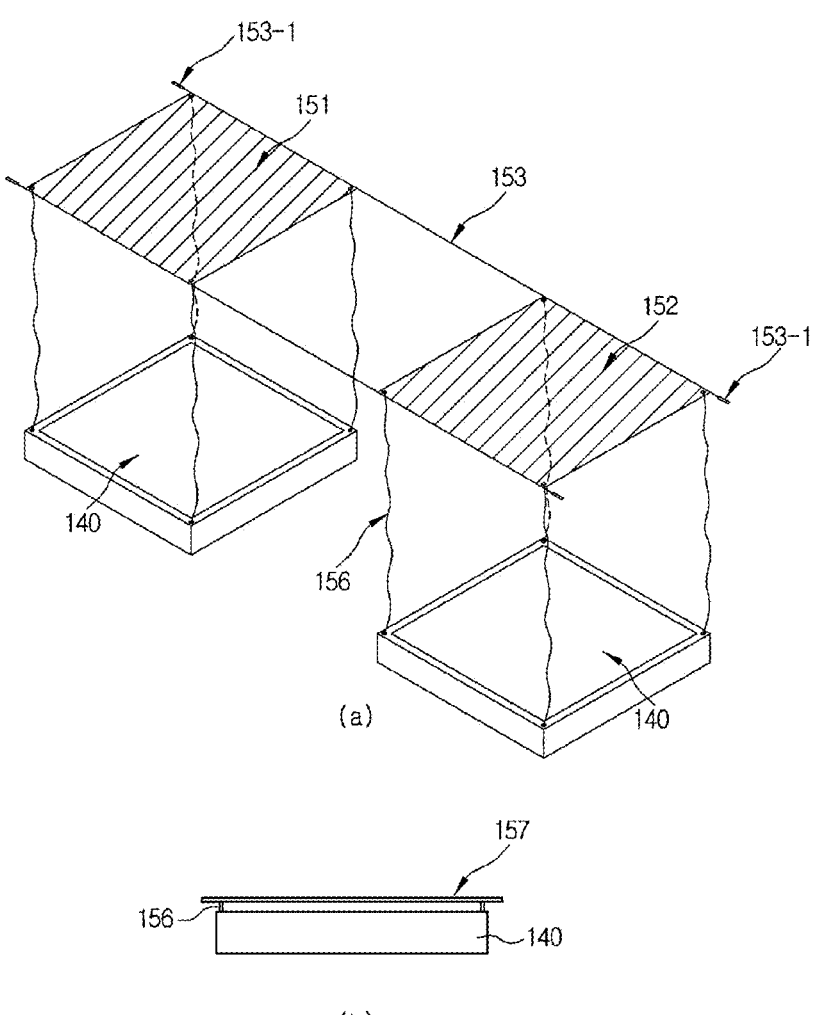
FIG. 17 is a view illustrating the state in which the left cover portion 151, right cover portion 152, and center cover portion 157 is attached to the cover drone 140.

Referring to FIG. 17, FIG. 17(*a*) shows an outer cover drone 150 consisting of two left and right cover drones 140. Specifically, the left cover portion 151 and the right cover portion 152 are connected by a cover portion rope 153.

In addition, the left and right cover portions 151 and 152 and cover drones 140 are connected and fixed with cords 156, respectively, so the left and right cover portions 151 and 152 rise to a certain height when the wind blows, and descend when the wind stops.

In addition, FIG. 17(*b*) shows the central cover drone 155 located between the left and right cover drones 140, specifically shows that the central cover portion 157 is fixed so that the rising height is limited by the cords 156.

Figure 18:
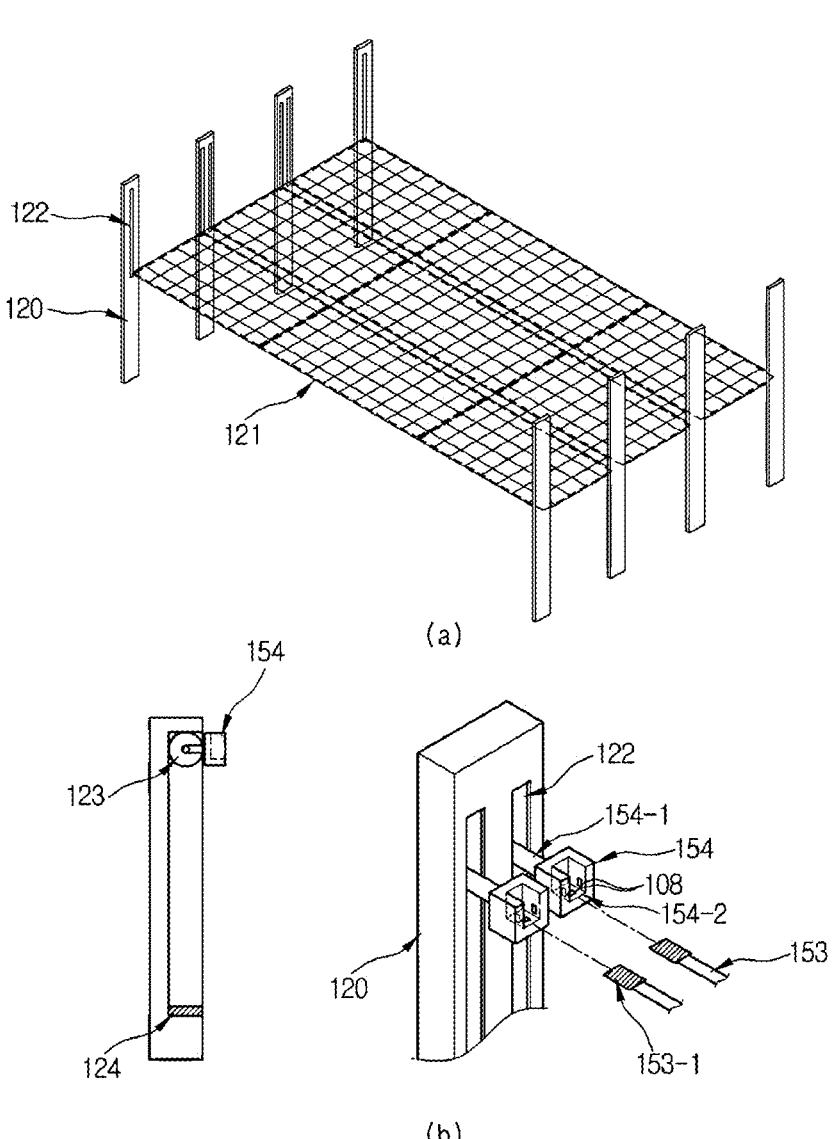
FIG. 18 is a view illustrating a wire net 121 on which the outer cover drone 150 and center cover drones 155 of FIG. 17 is installed

FIG. 18 relates to an installation structure of a wire net 121 in which a drone 140 having left and right cover portions 151 and 152 of FIG. 17 and a drone 140 having a central cover portion 157 will be seated.

First, a vertical support 120 has one slit groove 122 at both ends and two in the middle, and the rubber roller 123 in the inner space of the vertical supports 120 are connected and fixed through the rope coupling bracket 154 and the protrusion 154-1.

Electromagnets 108 are installed on the left, right, and bottom of the rope insertion groove 154-2, so that the iron plate coupling parts 153-1 formed at both ends of the cover portion rope 153 connected to the left and right cover portions 151 and 152 can be fixedly coupled when inserted into the rope insertion groove 154-2.

Although not shown, a electric wire for driving the electromagnet 108 is installed on the vertical supports 120.

Looking at the operation, the drone 140 with the center cover portion 157 first rises and is seated on the center of a wire net 121, and then the drone 140 with the left and right cover portions rises and are seated on the wire net 121 at both sides of the drone 140 with the center cover portion 157, and the iron sheet coupling part 153-1 at both ends of the cover rope 153 can be coupled to the rope insertion groove 154-2 in which the electromagnet operates.

When the wind blows after installation, the left and right cover portions 151 and 152 rise together with the rope coupling bracket 154, and at this time, the wind escapes between the left and right cover portions and the central cover portion, and when the wind stops, the cover portions descend together by their own weight.

Figure 19:
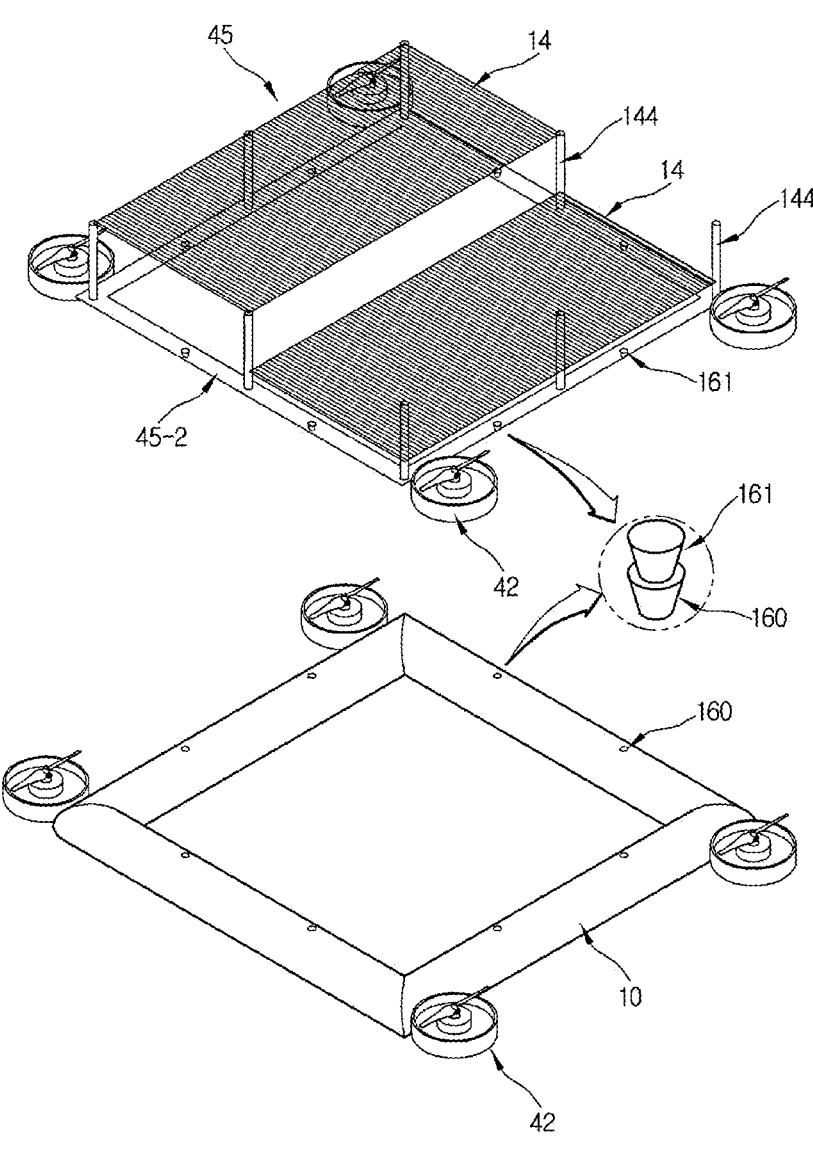
FIG. 19 is a view illustrating an embodiment in which a cover drone with cover portion of different heights is installed in the advertising balloon frame.

FIG. 19 shows other embodiment of a cover drone 45.

A lower protrusion 161 on the lower part of the frame of the cover drone 45 can be inserted into a receiving groove 160 on the upper part of the ad balloon frame 10, so that the cover drone 45 and ad balloon frame 10 are combined.

Also the cover drone 45 has two cover portions 14, and the cover portion is connected to the vertical support 144 with different rising heights, so that even if it is windy, the rising height of the cover portion is different, so the wind can rise and pass through, thus it can stably provide a shade tarp.

Also, in FIG. 19 the drone body 41 may be installed with batteries 43 appropriately distributed on the top or side of the frame 10 and the cover portion frame 45-2, although not shown, and the propeller drive body 42 of the frame 10 may also be coupled to a frame support installed on the bottom of the frame 10, although not specifically shown.

Figure 20:
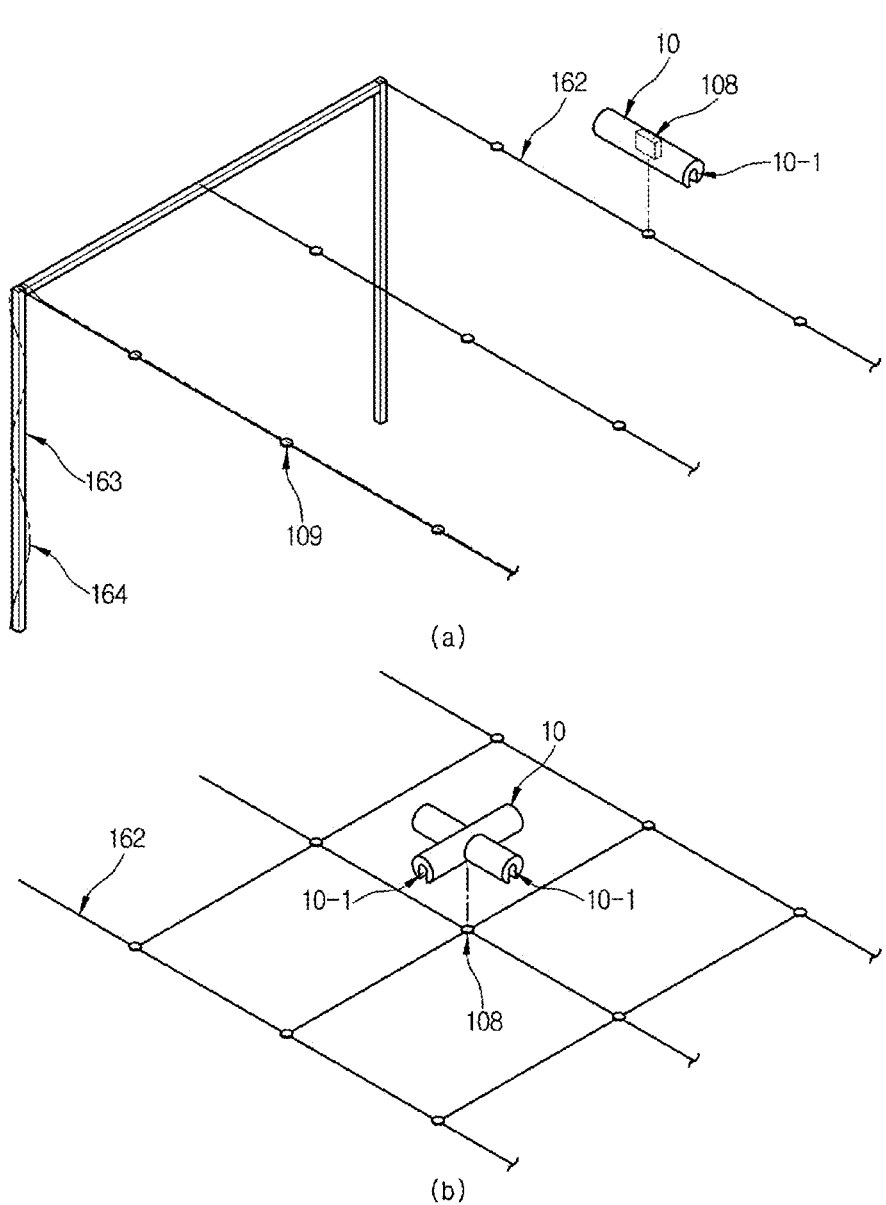
FIG. 20 is a view illustrating a mounting structure of frame 10 and the wire 162 installed in the air.

FIGS. 20(*a*), (*b*) illustrate a frame 10 of a drone shade tarp (or a cover drone) having a coupled groove 10-1 formed in its lower portion so that it's seated stably, as it rests on a wire 162 installed in the air.

Because the wire 162 functions similar to the rope 103, they are used together.

FIG. 20(A) shows that a straight groove 10-1 is formed in the lower part of the frame to be coupled to the straight wire 162.

Also, the wires are installed with magnetic bodies 109 such as an iron sheet at regular intervals, and the frame 10 is equipped with electromagnets 108 in the corresponding position.

After the frame is seated on the wires, if the electromagnets are enabled, the frame 10 can be firmly fixed to the wire.

In addition, on the contrary, electromagnets can be installed on the wire and magnetic materials can be installed on the lower part of the ad balloon frame, In this case, the electromagnet is energized by a electric wire 164 from the ground.

FIG. 20(*b*) shows that the wire 162 on which the drone shade tarp (or cover drone) is seated is in a latticed shape to correspond to the lattice-like frame 10, and a groove is formed in the lower part of the lattice-like frame 10 so that the wire 162 can be inserted into the groove of the frame 10 to be stably fixed.

Also an electromagnets 108 is installed at the intersection of the wire 162, and there is magnetic bodies 109 at a corresponding position of the frame 10, although not shown, so that the frame 10 can be fixed reliably.

Here, it goes without saying that the location of the electromagnet and the magnetic body may be changed in consideration of the convenience of installation.

Meanwhile, GPS GPS receivers can be installed on the wire to ensure that the drone shade tarp sits correctly on the wire 162.

Figure 21:
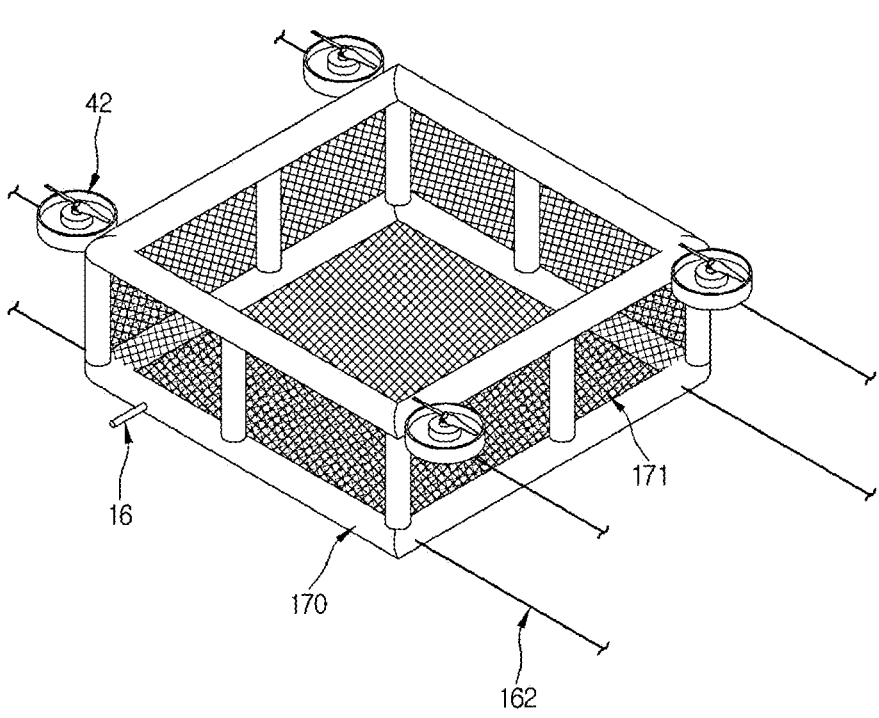
FIG. 21 is a view illustrating a drone shade tarp storage frame for drone shade tarp.

FIG. 21 illustrates that a drone shade tarp storage frame 170 made of a light mesh net 171 and an ad balloon frame is moved in the air and landed on the wire.

When a drone shade tarp (or cover drone) is installed on wire 162 for a long time, it is not easy to remove and reinstall it when the sun goes down or rises. In the evening, the drone shade tarp (or cover drone) can be stacked and stored sequentially in the drone shade tarp storage frame 170, so it has the advantage of being able to remove and install quickly and efficiently by reducing the travel distance of the drone shade tarp (or cover drone).

Figure 22:
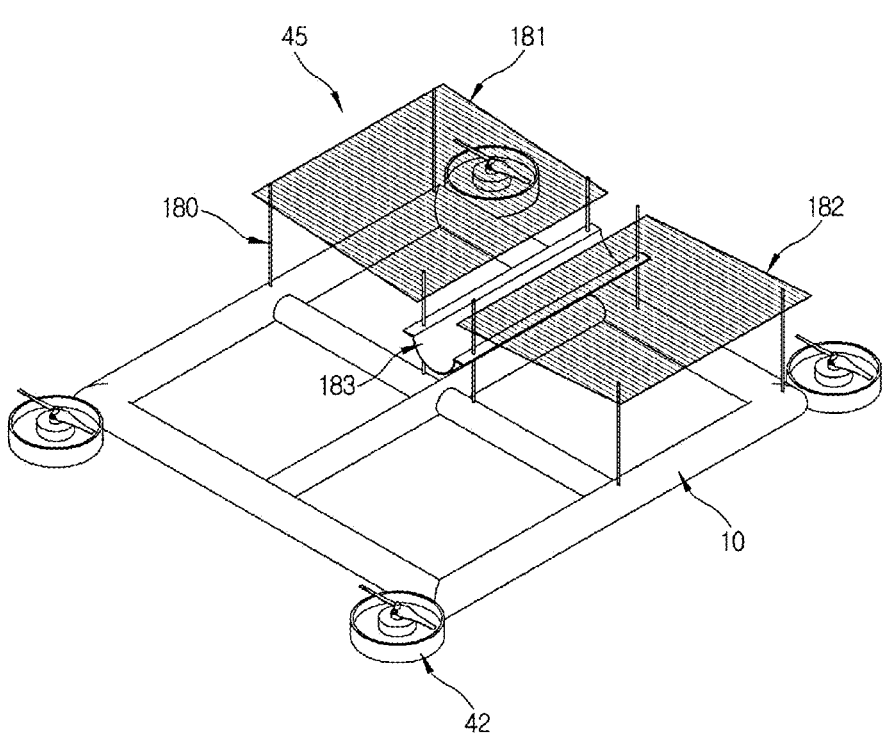
FIG. 22 is a view illustrating a cover drone with a rain tray 183.

Referring now to FIG. 22, a cover drone 45 equipped with a rain tray 183, Although it is not shown in FIG. 22, as shown in FIG. 4, the propeller drive body 42 connected and fixed to the frame support 52 installed on the upper surface of the frame 10.

The vertical rod 180 installed on the upper part of the frame support 52 and the left and right cover portions 181 and 182 are fixed on the upper part of the vertical rod 180, but the left and right cover portions 181 and 182 are fixed high on the outer vertical rod 180, and are fixed slightly low on the inner vertical rod 180, so as to incline toward the center.

A rain tray 183 fixed to the inner vertical rod 180 is installed in the center to move rainwater flowing down from the left and right cover portions 181 and 182.

Only two cover portions are shown in the drawing, but the remaining two cover portions in the front are also the same and thus are omitted.

Figure 23:
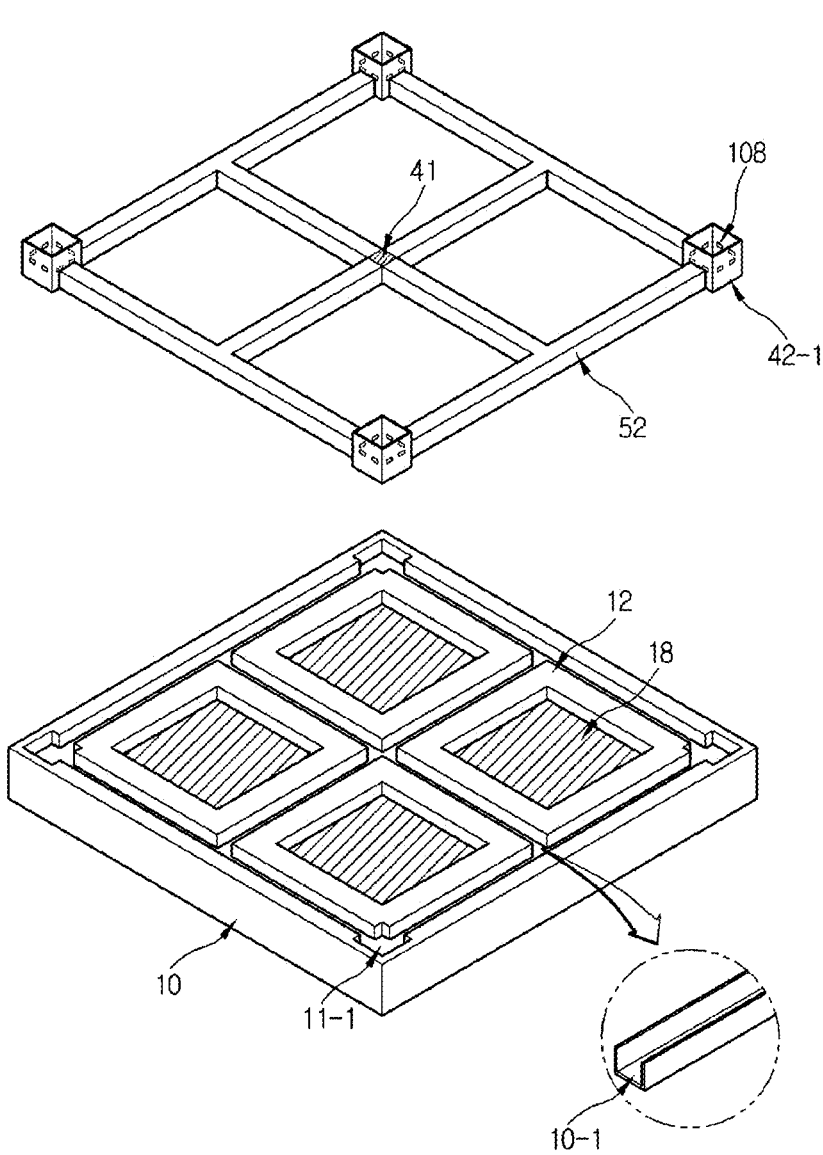
FIG. 23 is a view illustrating the combination of an ad balloon frame 10 and a latticed square frame support 52 with inner space 18 respectively, also showing the groove 10-1 into which a latticed square frame support 52 is inserted and joined together.

FIG. 23 illustrates another embodiment of the cover drone 45, wherein the ad balloon frame 10 has propeller drive body receiving grooves 11-1 at four corners and grooves 10-1 formed between the outer frame and the latticed inner frame 12.

In FIG. 23, a propeller drive body accommodation part 42-1 and a frame support 52 are inserted into propeller drive body receiving grooves 11-1 and grooves 10-1 and fixedly coupled respectively, and inner space 18 is formed in the inner frames 12, so that when the wind blows, it escapes through the said inner space 18, so that the cover drone can be stabilized.

For the effect of the shade tarp, a person skilled in the art can appropriately select the size of the inner space 18 and the height of the inner frame 12.

In addition, electromagnets 108 can be installed on the floor or side to fix the propeller drive body 42 inside the propeller drive body accommodation part 42-1, and magnetic materials such as iron sheets can be installed at the corresponding position of the propeller drive body 42.

In another embodiment of the cover drone of FIG. 11, FIG. 24 has a cover part formed inside the square frame support 52 so that a cover portion 14 moves by the drone instead of the fixed cover portion 14.

A lower protrusion 161 is formed at the four corners of the frame support, and a conical receiving groove 160 is formed at the cover connecting bar 79 (see FIG. 11), so that the lower protrusions 161 may be seated and fixed in the four receiving groove 160 by moving the cover portion by a drone.

This has the advantage of quickly separating the cover part when the weather is bad to promote safety.

FIG. 26 shows another embodiment of the cover drone 45 of FIG. 9. This embodiment consists of a low-rising cover portion and a high-rising cover portions that are connected by cords 156 to the frame 10 and guided by vertical rods 158, in the FIG. 26, only the back two are shown for convenience.

One side of the cover portion, which is lowly raised by the wind, is connected to the frame by cords 156, and a eyelets or small holes (not shown in FIG. 26) inserted into the vertical rod 158 is formed on the other side to guide cover portion's rise and fall clearly.

In addition, a small holes (not shown) called eyelets is formed on one side of the high-rising cover portion and inserted into a vertical rod 158, and the other side is connected to the frame with cords 156.

Bars 191 with a magnetic conical hole 191-1 are coupled to the other two sides of the cover portion, and cover connecting bar 195 with magnetic conical hole 195-1 is movably coupled to the vertical support 163.

Electromagnet cone 192 formed on both arms 193 of the drone 40' are inserted into the magnetic conical holes of the bar 191 and the cover connecting bar 195, and bar 191 is movably connected to vertical support 163 by drone 40' (FIG. 26 shows only one connection using drone 40' for convenience).

In addition, although not shown, a stopper (rubber ring) may be installed on the vertical rod 158 that limits the rising height of the low-rising cover portion and high-rising cover portion inserted into the vertical rod 158.

Here, the bar 191 is coupled to the right side of the cover portion, but may extend from the right side to the left side of the cover portion, that is, to the vicinity of the eyelet, to guide cover portion's rise and fall clearly.

In addition, a magnetic material 109 with an iron powder can be applied to several of the borders of cover portion, and an electromagnet 108 or magnet can be installed at the corresponding position of the top of frame to fully attach the cover to the frame to implement the shade function when the wind is weak or not.

In this embodiment, the high-rising cover is movably coupled to the vertical support 163 by a drone equipped with an arm 193.

When the wind blows, the cover portion is guided to the vertical support 163, so that it can rise and fall vertically without flying around in the wind, and it has the advantage of easily installing or removing a drone shade tarp using drones.

Figure 27:
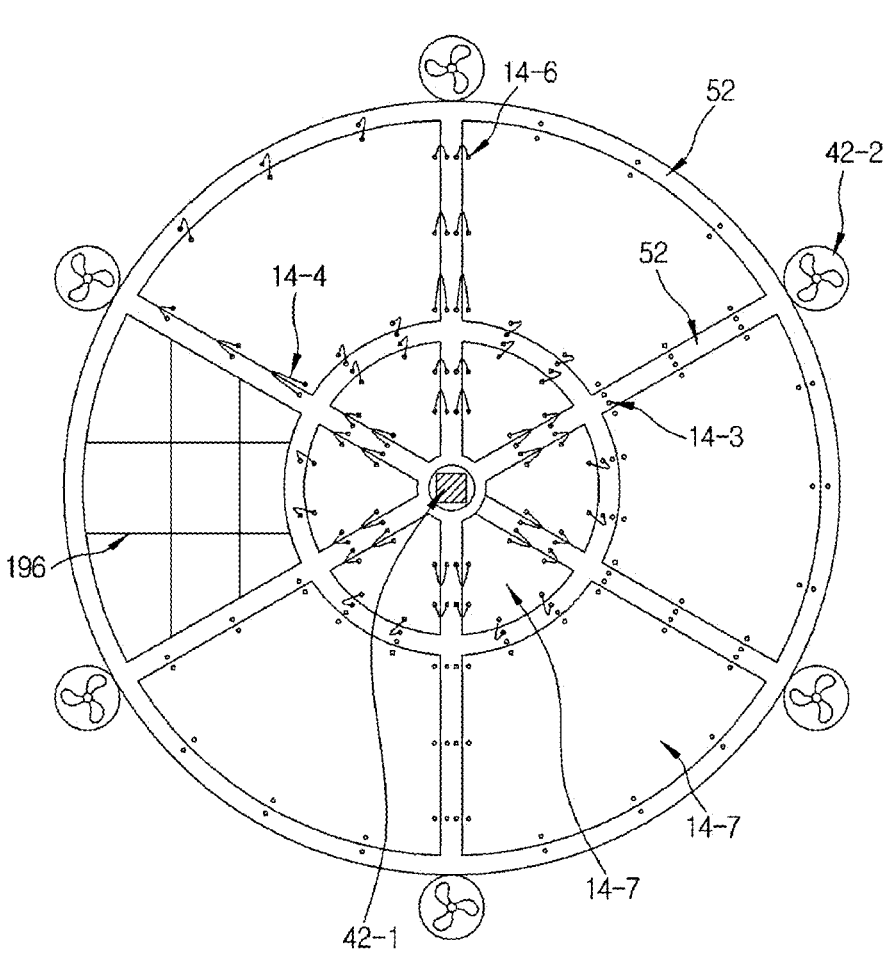
FIG. 27 is a view illustrating another embodiment of a circular drone shade tarp.

FIG. 27 is another embodiment of the cover drone (45) consisting of a combination of two concentric frame supports 52 and several radial frame supports 52 in the radial direction, and propeller driving bodies 42 may be installed at the end of the radial frame support 52, and a drone body 41 may be installed at the center of the concentric frame supports 52.

A conical cover portion 14-7 is installed in the space between the concentric frame support 52 and the radial frame support 52 (the number of concentric frame supports and radial frame supports can be varied).

A cover cord holes 14-6 is formed on the border of the conical cover portions 14-7, and a frame cord hole 14-3 is formed on the frame support 52 near the edge of the conical cover portions 14-7, and each of the halls is connected by a cord 14-4, so that the conical cover portions 14-7 can be installed on the upper surface of the frame supports 52.

Furthermore, a lower wire 196 can be installed on the lower surface of the frame supports (52) as shown in part in FIG. 27 to prevent the above conical cover portions 14-7 from sagging into the space between the frame supports 52.

Additionally, as shown in FIG. 7, the conical cover portions 14-7 are connected to the frame support by cords, and the length of the cord increases from the bottom to the upper side of the conical cover portions.

Figure 28:
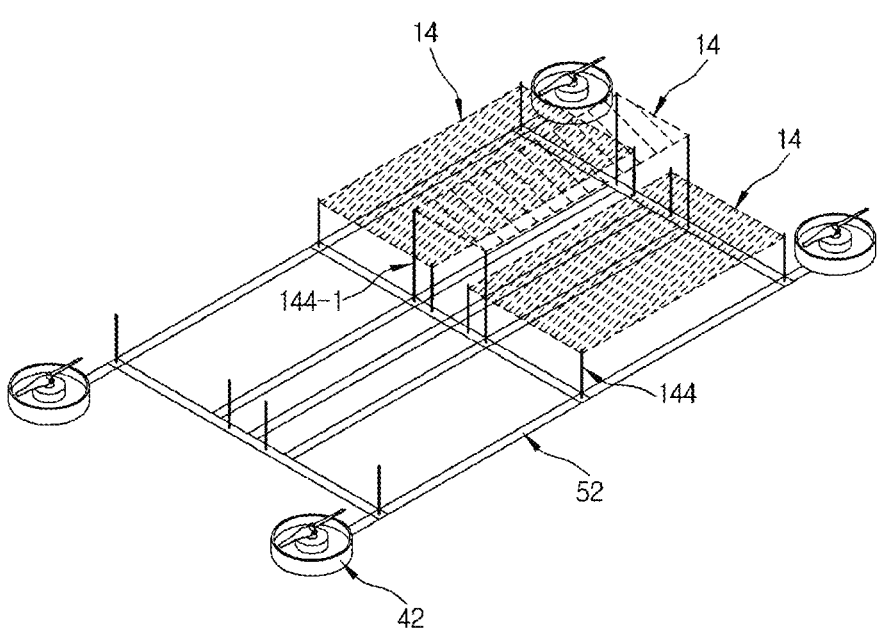
FIG. 28 is a view illustrating another embodiment of a drone shade tarp with a cover portion of different heights.

FIG. 28 shows another embodiment of the cover drone, which has a cover portion that rises and descends to a low height along the vertical rod 144 on both left and right sides, and a cover portion that rises and descends to a high height along the central vertical rod 144-1 at the center (the same cover portion should be shown on the front, but this was omitted for convenience).

When the wind blows, the wind rises and escapes to the left and right sides and the center, so not only is the shade tarp stabilized, but the cover portion overlaps, so the effect of the shade tarp is great.

Figure 29:
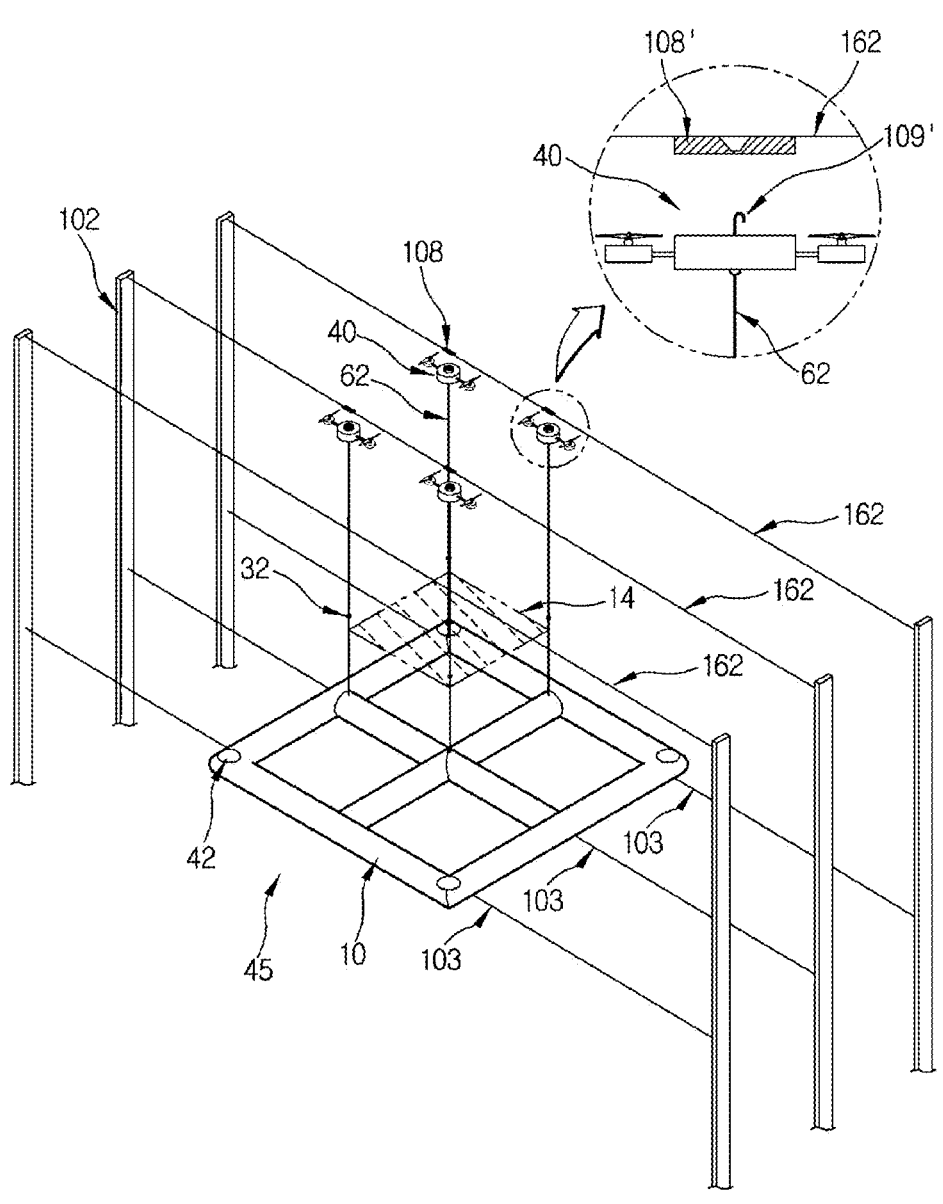
FIG. 29 is a view illustrating that the vertical cord 62 through the cover portion connected to the wire by drone.

FIG. 29 illustrates that the vertical cord 62 that guides the rise and fall of the cover portion 14 in the drone shade tarp (or cover drone) is easily coupled to the wire 162 in the air using a drone.

First, vertical cords 62 fixed to the four corners of the lattice-like frame 10 of the drone shade tarpaulin landed on the rope 103 pass through the eyelets (not shown) of the cover portion 14 and are fixed to the lower side of the drone.

Since there is a magnetic hook 109' on the upper part of the drone 40, it is inserted and fixed into the groove of the electromagnet 108' installed on the wire 162, it has the advantage of being able to easily connect the vertical cord 62 and quickly disassemble it.

Although only one cover portion 14 is shown for convenience, it can be actually installed in all inner frames with inner space in the frame 10.

Figure 30:
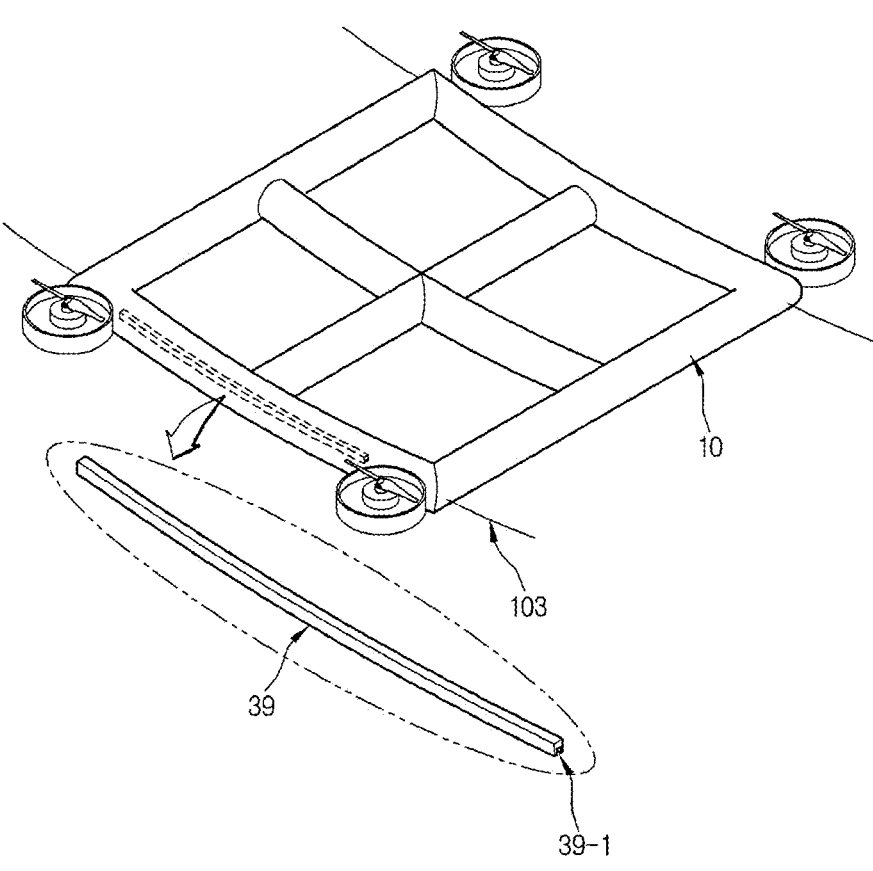
FIG. 30 is a view illustrating an embodiment in which a curved frame support 39 is made in consideration of the sagging of the rope 103 on which the frame 10 is seated, according to an embodiment of the present invention.

FIG. 30 shows a configuration for preventing the frame 10 on the rope 103 from being unstable by wind, since the rope 103 on which the ad balloon frame 10 is seated is sagging by its own weight during installation, the rope 103 is not inserted over the entire length of the coupled groove 10-1 of the frame 10 to be seated.

Specifically, by forming a curved frame support 39 bent with the same curvature as the sagging curve of the rope 103, and forming a groove 39-1 on the lower surface with the same curvature, the rope 103 is inserted over the entire length of the frame 10 so that the frame can be stably installed on the rope.

Here, since the frame is made of vinyl or cloth, the curved frame support 39 is attached to the lower part of the frame 10, but the lower part of the frame is made of the same curvature as the curved frame support 39.

This may be applied by attaching a curved frame support 39 to the lower part of frame 10 in which a groove is formed on the lower side seated on the rope or wire described above.

Figure 31:
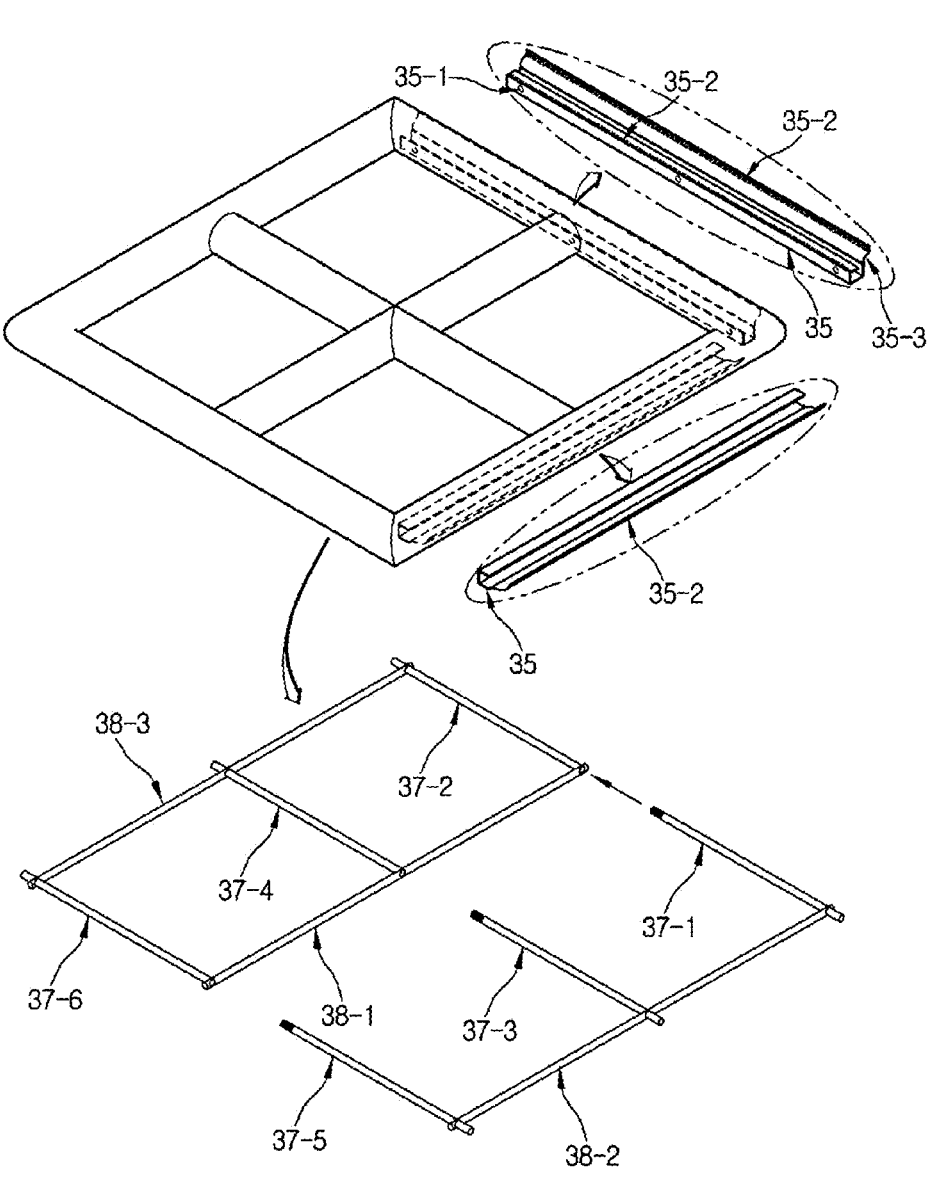
FIG. 31 is a view illustrating an embodiment using insertion holes of opening and closing storage boxes to couple frame supports inside an ad balloon frame.

FIG. 31 illustrates that opening and closing storage boxes 35 formed on the upper or right side of the frame (only two are shown in FIG. 31) so that the frame supports installed inside the frame can be easily installed and removed.

To explain this in more detail, the opening and closing storage boxes 35 in which the frame supports are inserted and stored is attached to four sides surface inside the frame 10, and in order to assemble the frame supports before air is injected into the frame 10, the lids 35-3 with the fasteners (Velcro patch etc) of the opening and closing storage boxes 35 are opened, the supports are put in, and assembled. When the lids 35-3 of the opening and closing storage boxes 35 are closed after assembly, sealing treatment may be performed with soft rubber or vinyl so as to be sealed.

To explain the embodiment, four opening and closing storage boxes 35 are installed on the sides inside the rectangular outer frame.

With the lid of the opening and closing storage box 35 open, the central frame support 38-1, the right frame support 38-2, and the left frame support 38-1 are inserted from the lower opening and closing storage box 35 to the upper opening and closing storage box 35 through the insertion hole 35-1.

And the upper connection frame supports 37-1 and 37-2 are screw-coupled to the central frame support 38-1 by passing through the through-holes (not shown) of the right frame support 38-2 and the left frame support 38-3, respectively. Also the central connection frame supports 37-3, 37-4 and the lower connection frame supports 37-5, 37-6 are screw-coupled to the central frame support in the same way.

Although not specifically explained here, the opening and closing storage boxes 35 may be installed and used on the upper surface or side inside the frame 10, but since the insertion holes 35-1 must be passed through by the frame supports, the insertion holes 35-1 of the upper and lower, or left and right opening and closing storage boxes 35 must be formed to face each other.

In addition, the drone can be mounted by extending the right frame support 38-2 and the left frame support 38-3 out of the frame 10 through the opening and closing storage boxes 35, and sealing can also be performed accordingly.

Figure 32:
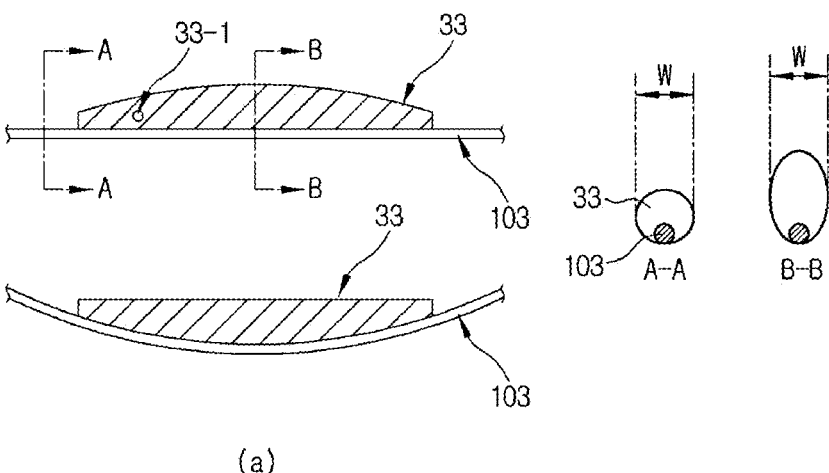
FIG. 32 is a view illustrating an embodiment with a rope-bonded air tube that prevents the ad balloon frame 10 from being slanted when the rope sags under its own weight.
Figure 32:
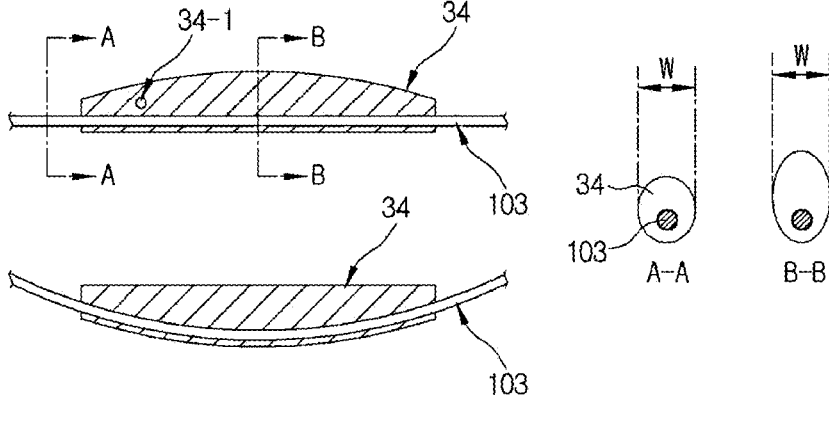

In addition, in FIG. 32(a), a rope-coupled air tube 33 was installed on the rope to prevent the frame 10 landing on the sagging rope from being inclined.

The upper side of the rope-coupled air tube 33 is the same as the sagging curvature of the rope, but on the contrary, it is formed upward, so that if the rope-coupled air tube 33 is sagging downward by its own weight after installation, the frame seated on the rope-coupled air tube 33 can be seated horizontally without being inclined.

The width (W) of the rope-coupled air tube 33 may be sufficient to be inserted into the groove 10-1 of the frame 10 to be seated.

FIG. 32(b) is the same as FIG. 32(a), but the rope-coupled air tube 34 differs in that the rope is not in contact with the air tube, but is inside the air tube 34, but its function is actually the same.

The materials forming the structure, such as frame support, cylindrical frame, support, etc., used in this invention are made of light and strong aluminum alloys, reinforced plastic (FRP), carbon composites, or Gigasteel.

In addition, although not shown in the drawings (FIGS. 5, 20, 26, 298, etc.) of this invention, in the case where the drone shade tarp (or cover drone) is landed on the rope or wire, a lower mesh net can be installed on the vertical support under the rope or wire to ensure safety, when the drone shade tarp (or cover drone) falls down due to strong winds, etc.

As described above, in the detailed description of this invention, specific embodiments have been described, but it goes without saying that various modifications are possible within the limit not departing from the scope of this invention.

Therefore, the scope of this invention should not be limited to the described embodiment, but should be determined by the claims described later as well as those equivalent to the claims.

The invention claimed is:

1. A drone shade tarp configured to be lifted in air by a drone to create shade on a surface, the drone shade tarp comprising:

an advertising balloon frame comprising an outer frame and an inner frame disposed inside the outer frame, the advertising balloon frame being formed by bonding a plurality of cylindrical vinyl sheets in a lattice-like square shape, the outer frame defining a plurality of holes;

a plurality of cylindrical frames configured to be received in the plurality of holes, the plurality of cylindrical frames including flanges;

a plurality of frame supports placed on an upper surface of the advertising balloon frame, attached to the cylindrical frames, and being hollow, square-shaped aluminum bars;

a plurality of cross-shaped supports configured to support and fix a plurality of propeller drive bodies of the drone inside the cylindrical frames;

a plurality of buffers attached to the flanges of the plurality of cylindrical frames;

a cover attached to four corners of the advertising balloon frame; and a plurality of guide bars provided at the four corners of the advertising balloon frame for guiding rising and falling of the cover, wherein the frame supports and are removably fastened to the flanges of the cylindrical frames by a plurality of coupling members using bolts and nuts.

2. A shade tarp using a drone to move into air to create shade on a surface, the shade tarp comprising:

a cover drone comprising a cover portion configured to cover an inner space formed inside an advertising balloon frame and cylindrical frames inserted into holes formed in four corners of the frame and propeller drive bodies installed inside the cylindrical frames, vertical supports; and ropes installed on a lower side of the vertical supports and wires installed on the higher side of the vertical supports wherein the cover drone is seated on the ropes, wherein a vertical cord fixed to the four corners of the lattice-like inner frame in the advertising balloon frame passes through four corners of the cover portion and is fixed to a lower side of the drone, and a magnetic hook installed on the upper side of the drone and a grooved electromagnet installed on the wire are combined and fixed, and guided along the vertical cords when the cover portion is raised and lowered.

3. A drone shade tarp configured to be lifted in air using a drone to create shade on a surface, the drone shade tarp comprising:

an advertising balloon frame comprising an outer frame and an inner frame disposed inside the outer frame, the advertising balloon frame being formed by bonding a plurality of cylindrical vinyl sheets in a lattice-like square shape, a plurality of frame supports disposed on an upper surface of the advertising balloon frame, the frame supports each including a coupling portion configured to be attached to a plurality of propeller drive bodies of the drone and a support portion configured to support and fix the advertising balloon frame, the frame supports being hollow, square-shaped aluminum bars; and a rope groove being formed between the coupling portion and the support portion of each of the plurality of frame supports and configured to receive a rope, wherein the frame supports are removably connected to the advertising balloon frame by the coupling portions using bolts and nuts.

4. The drone shade tarp of claim 3, further comprising a plurality of guide bars coupled to inner four corners of the advertising balloon frame.

5. The drone shade tarp of claim 4, wherein the advertising balloon frame further defines an inner space configured to receive a cover drone, the advertising balloon frame forming ventilation holes.

6. The drone shade tarp of claim 5, further comprising electromagnets respectively installed on central upper parts of inner four sides of the inner frame, the electromagnets including magnetic bodies in the form of thin iron sheets and attached to central lower parts of outer four sides of the cover drones, so that the cover drone is seated and fixed on the inner frame.

7. The drone shade tarp of claim 5, wherein the cover drone includes four drones coupled to a cover rectangular frame coupled to a cover, and each of the four drones is equipped with an upper hinge block and a lower hinge block, and the cover rectangular frame is hinged to the lower hinge block on one side and the cover rectangular frame is hinged to the upper hinge block on another side to form an inclined shade tarp.

8. The drone shade tarp of claim 5, wherein the cover drone includes a lower protrusion formed at a lower part of the cover frame, the lower protrusion being configured to be inserted and coupled to a receiving groove formed at an upper part of the advertising balloon frame, and cover portions are guided by vertical supports to ascend and descend, but an elevation height is different for each of the cover portions.

9. The drone shade tarp of claim 5, wherein the cover drone includes a vertical rod installed on an upper part of the advertising balloon frame and left and right cover portions fixed on the upper part of the vertical rods, wherein the left and right cover portion are fixed high to outer vertical rods so as to be inclined toward a middle part, are fixed low to inner vertical rods, and a rain tray is installed in the middle part to be fixed to the inner vertical rods, so that rainwater flowing down from the left and right cover portions are collected as a rain tray.

10. The drone shade tarp of claim 5, wherein the cover drone comprises coupled grooves formed between the propeller drive body receiving grooves at the four corners of the advertising balloon frame and the inner frame, and inserted and fixedly coupled by the propeller drive body accommodation part and the frame support respectively, wherein an inner space is formed in the center of the inner frame and exits through the inner space when wind blows.

11. The drone shade tarp of claim 5, wherein the cover drone installs windshields on the frame support so that the propeller rotates on an upper part of the cylindrical frame, and the frame support is inserted into and fixed in the coupled groove of the advertising balloon frame, and the drone shade tarp further comprises cover portions installed on the upper part of the inner spaces, respectively.

12. The drone shade tarp of claim 5, wherein the cover drone installs windshields on the frame support so that the propeller rotates on an upper part of the cylindrical frame, and the frame support is inserted into and fixed in the coupled groove of the advertising balloon frame, wherein a left side of one cover portion is connected to cords, a right side is inserted into the vertical rods, the left side of the other cover portion is inserted into the vertical rods, the right side is connected to the bars, and magnetic cone protrusions formed on both sides of the drone's arms are inserted into and fixed in magnetic cone holes formed in the cover connecting bars of the vertical supports, and a magnetic material of iron powder is applied to several of the borders of cover portion to combine with a electromagnet installed on the advertising balloon frame.

13. The drone shade tarp of claim 5, wherein the propeller drive bodies are installed inside only some of the cylindrical frames formed at four corners of the advertising balloon frame, wherein the drone shade tarp further comprises a cover frame connected to the cylindrical frames, the cover frame including four sides defining a square and two diagonal lines of the square, the cover frame including four triangular covering portions.

14. The drone shade tarp of claim 13, wherein each of the triangular covering portions includes a base attached and fixed to the advertising balloon frame, and two sides of the triangular covering portions are connected and fixed to the cover frame through a cord.

15. The drone shade tarp of claim 5, wherein the cover drones are combined with other cover drones to form a shade tarp, without an advertising balloon frame on which the cover drone is seated, wherein to combine one cover drone and another cover drone, one cover drone attaches an electromagnet to a center of outer four sides of the frame, another cover drone attaches iron sheets to the center of the outer four sides, and the cover drone located at the center is connected to an electric wire connected on the ground, and an electrode that supplies electricity within the combination of electromagnets and iron sheets to which the cover drones are combined is formed, respectively.

16. The drone shade tarp of claim 15, wherein one cover drone is equipped with an accommodation part at a position of the electromagnet and the other cover drone is installed with a protrusion part at the position of the iron sheet, wherein the protrusion of the other cover drone is inserted into the accommodation part of one cover drone so that multiple cover drones are coupled.

17. A shade tarp where the drone shade tarp of claim 5 is configured to be seated on a rope installed by a support,
    wherein a groove into which the rope is inserted is formed at a bottom of the advertising balloon frame, a plurality of electromagnets being installed in the groove, magnetic bodies being formed at a plurality of positions corresponding to the rope, the shade tarp comprising a lower net installed on the support.

18. The shade tarp of claim 17, wherein a frame support with a groove is attached to a lower side of the advertising balloon frame.

19. The shade tarp of claim 18, wherein the frame support is a curved frame support to alleviate sagging when installing the rope.

* * * * *